United States Patent [19]

Takagi et al.

[11] Patent Number: 5,371,568
[45] Date of Patent: Dec. 6, 1994

[54] AUTOMATIC FLASH LIMITING APPARATUS IN A CAMERA

[75] Inventors: Tadao Takagi, Yokohama; Norikazu Yokonuma, Tokyo, both of Japan

[73] Assignee: Nikon Corporation, Tokyo, Japan

[21] Appl. No.: 156,651

[22] Filed: Nov. 16, 1993

Related U.S. Application Data

[63] Continuation of Ser. No. 718,993, Jun. 21, 1991, abandoned.

[30] Foreign Application Priority Data

Jun. 26, 1990 [JP] Japan .................. 2-165553
Oct. 24, 1990 [JP] Japan .................. 2-284209

[51] Int. Cl.$^5$ ........................................... G03B 15/05
[52] U.S. Cl. .................. 354/415; 354/416; 354/132
[58] Field of Search ................ 354/415, 416, 132

[56] References Cited

U.S. PATENT DOCUMENTS

| | | | |
|---|---|---|---|
| 4,592,639 | 6/1986 | Nakamura | 354/416 |
| 4,897,684 | 1/1990 | Serikawa | 354/416 |
| 4,951,081 | 8/1990 | Hosomizu et al. | 354/415 |
| 4,999,663 | 3/1991 | Nakamura | 354/415 |
| 5,268,730 | 12/1993 | Takagi | 354/415 |

FOREIGN PATENT DOCUMENTS

| | | |
|---|---|---|
| 3637645 | of 1988 | Germany . |
| 56-89728 | 7/1981 | Japan . |
| 60-15626 | 1/1985 | Japan . |
| 1-285925 | 11/1989 | Japan . |
| 2125568 | of 1984 | United Kingdom . |

*Primary Examiner*—Russell E. Adams
*Attorney, Agent, or Firm*—Shapiro and Shapiro

[57] ABSTRACT

The apparatus of the present invention is provided with flashing device for effecting preliminary flashing and main flashing, a split photometry unit for metering reflected light from the area of the object field divided into a plurality of areas and outputting a photometric output for each of these areas, preliminary flashing control unit, a calculation unit and a main flashing control unit. The preliminary flashing control unit causes the flashing device to effect preliminary flashing prior to main flashing, and when in that case, at least one of the photometric outputs from the split photometry unit reaches a predetermined value, causes the flashing device to repeat the preliminary flashing while decreasing the quantity of emitted light thereof, and when the photometric outputs become null before the predetermined value is reached, causes the flashing device to stop the preliminary flashing. The calculation unit determines the divided areas which are not used for the flash limiting during the main flashing by the use of the photometric outputs and the quantity of emitted light during preliminary flashing at the last stage. The main flashing control unit controls the main flashing of the flashing device on the basis of the output of the calculation unit.

66 Claims, 21 Drawing Sheets

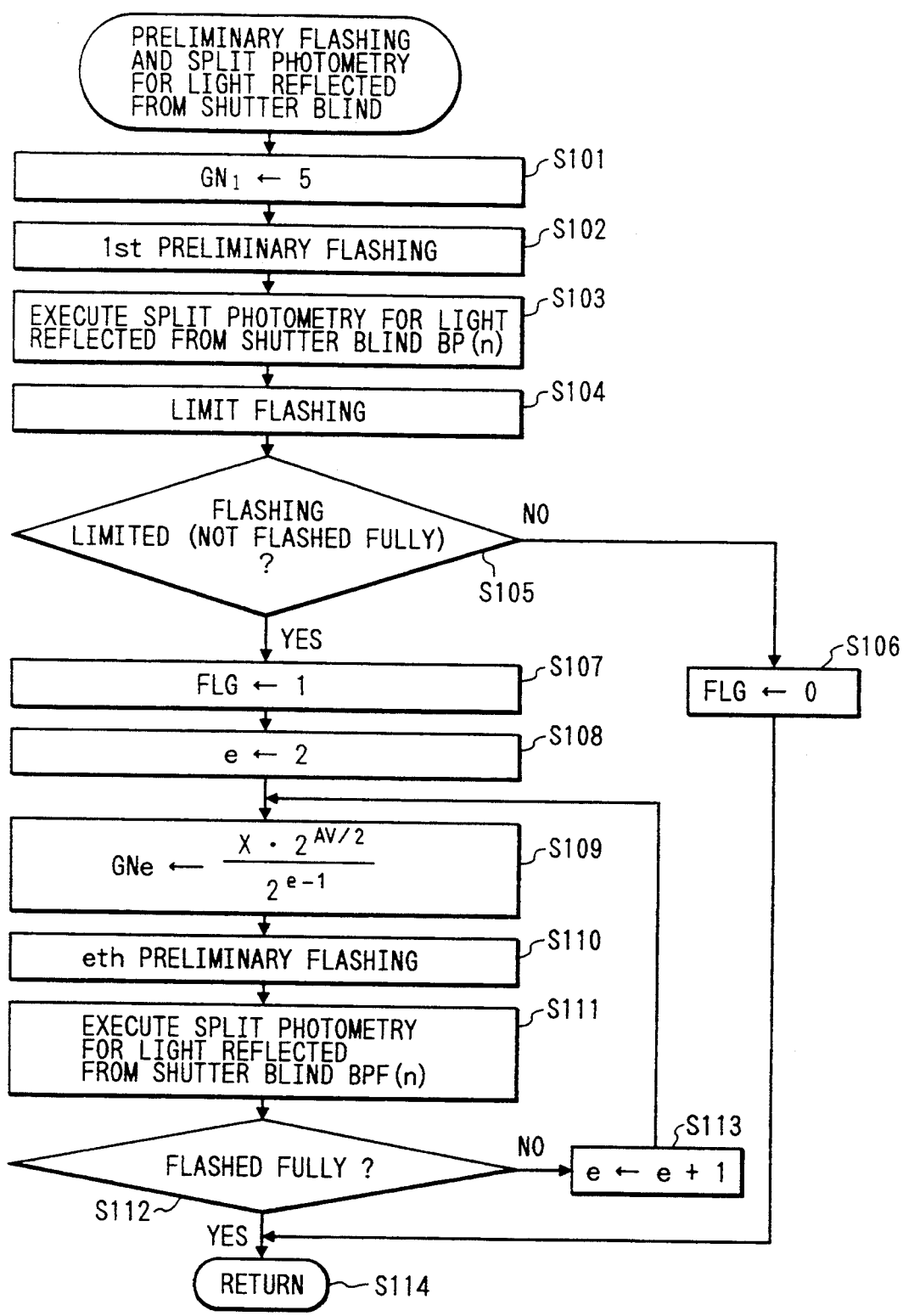

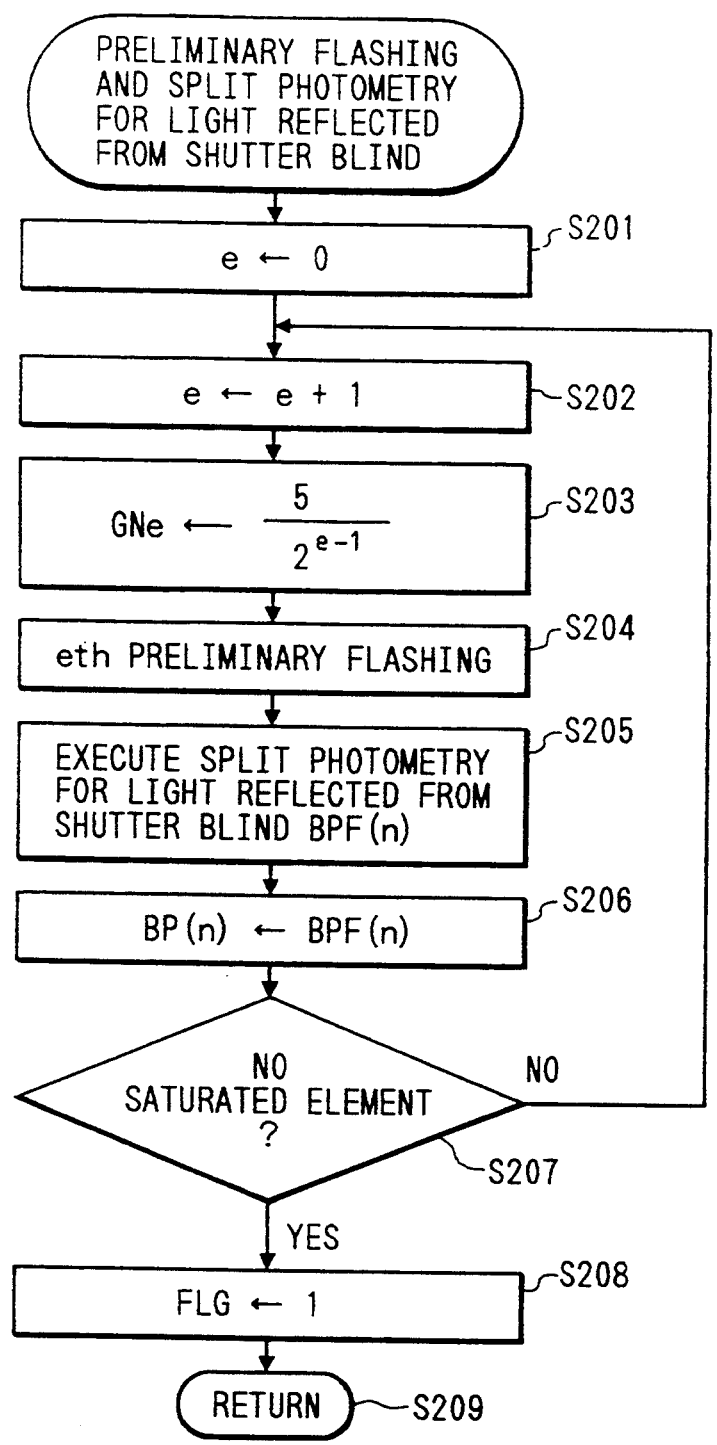

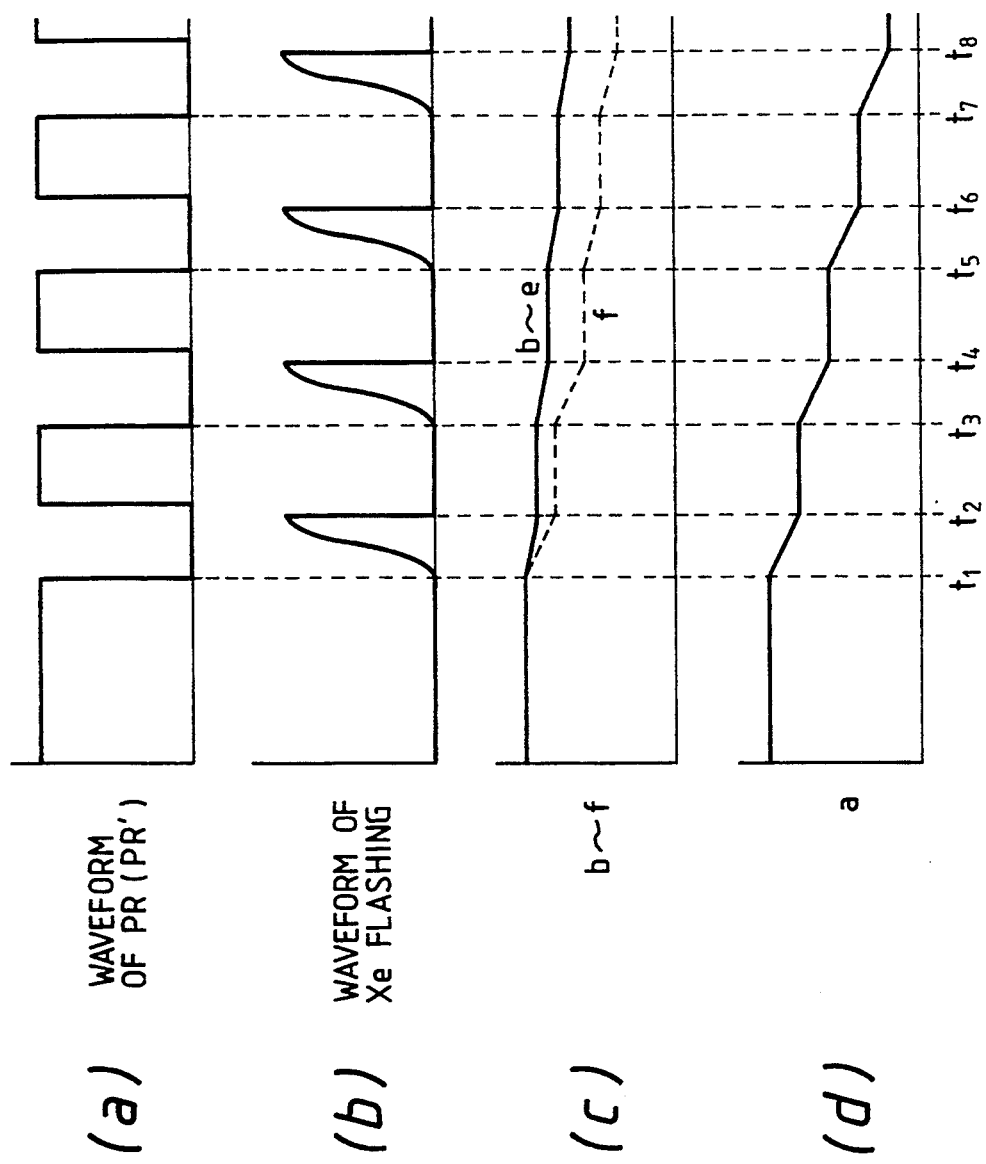

AUTOMATIC FLASH LIMITING APPARATUS IN A CAMERA

This is a continuation of application Ser. No. 718,993 filed Jun. 21, 1991, now abandoned.

BACKGROUND OF THE INVENTION

1. Field of the Invention

This invention relates to an automatic flash limiting apparatus in a camera for dividing the object field into a plurality of photometry areas and limiting flash on the basis of a photometric output from each area.

2. Related Background Art

Apparatuses of this kind according to the prior art include an apparatus as disclosed in Japanese Laid-Open Patent Application No. 60-15626. This publication discloses an automatic flash control camera as will hereinafter be described.

The front face of a camera body is provided with a stroboscopic light emitting portion for main flashing, an infrared stroboscopic light emitting portion for preliminary flashing, and a photometry portion for receiving these stroboscopic lights. This photometry portion is formed so as to meter the reflected light from an object while dividing it into the central portion and the marginal portion of the picture plane.

First, in this camera, the infrared stroboscopic flash emitting portion is caused to emit light, and the infrared light is measured while the reflected light from an object is divided into the central portion and the marginal portion of the picture plane, and in which of the two areas the main object exists is judged from the difference therebetween. In conformity with this judgment, the photometric system of the photometry portion is changed over to one of central portion priority photometry, marginal portion priority photometry and average photometry.

Next, the stroboscopic light emitting portion for main flashing emits light in synchronism with a shutter operation. During this light emission, the reflected light from the object is divisionally metered by one of the above-mentioned photometric systems, and when the integrated value of this reflected light reaches a predetermined value, the stroboscopic light emitting portion stops emitting light.

However, in the prior art disclosed in this Japanese Laid-Open Patent Application No. 60-15626, no countermeasure has been taken for the reflected light from an object of high reflectivity which generally adversely affects TTL flash control, such as a mirror or a gold-leafed folding screen which exists in the area to be photographed, and this has led to the problem that this object cannot be distinguished from the main object with a result that in some cases, substantial under-exposure is effected.

Also, as a technique of controlling stroboscopic photographing, there has heretofore been a technique as shown in Japanese Laid-Open Patent Application No. 56-89728 wherein preliminary flashing is effected prior to main flashing and the quantity of relfected light from an object by the preliminary flashing is measured and the quantity of main flash during stroboscopic photographing is corrected from the result of the measurement.

In the prior art, however, the quantity of reflected light from an object has been small and accurate photometry has been impossible when the reflectivity of the object is small or when the object is far away.

Also, the quantity of reflected light from an object may be excessive and lead to waste of energy when the reflectivity of the object is great or when the object is near.

Further, in the prior art, accurate measurement has been impossible unless the reflectivity of an object is uniform and the reflectivity is standard. For example, when there is a mirror in the photographing picture plane, the quantity of reflected light by preliminary flashing may be too great to accomplish photometry.

Also, in such an apparatus, the distance to an object must be measured, and this has led to the disadvantage that a camera system other than a camera system having an automatic focus apparauts cannot be used.

SUMMARY OF THE INVENTION

The present invention has as its object the provision of an apparatus which enables proper flash photographing to be accomplished without the main object being affected even if there is in the area to be photographed an object of high reflectivity which generally affects TTL flash control, such as a mirror or a gold-leafed folding screen.

To ahieve the above object, the apparatus of the present invention is provided with preliminary flashing control means for effecting preliminary flashing a plurality of times at a known quantity of emitted light prior to main flashing, and main flashing control means for effecting flash control during main flashing on the basis of the quantity of emitted light during preliminary flashing and the photometric output during preliminary flashing (the output of the area of the object field divided into a plurality).

According to the present invention, it is possible to accurately know the absolute value of the quantity of emitted light during preliminary flashing and the absolute value of the photometric output during preliminary flashing and therefore, for example, the absolute value of the quantity of emitted light divided by the photographing distance and the aperture value is compared with the absolute value of the photometric output, whereby whether the portion in which the photometric output is high is a main object or something that should be cut in flash control, such as a mirror or a gold-leafed folding screen can be distinguished. Thus it becomes possible to make the main object the subject of preponderant flash control and exclude objects of high reflectivity from the subject of flash control, and proper light emission and exposure can be accomplished with a very high reliability.

BRIEF DESCRIPTION OF THE DRAWINGS

FIGS. 6 to 13 are flow charts showing the subroutines executed by the CPU, FIG. 6 being a flow chart showing the details of the step S12 of FIG. 5, FIG. 7 being a flow chart showing the details of a modification of the step S12 of FIG. 5, FIG. 8 being a flow chart showing the details of another modification of the step S12 of FIG. 5, FIG. 9 being a flow chart showing the details of the step S13 of FIG. 5, FIG. 10 being a flow chart showing the details of the step S14 of FIG. 5, FIG. 11 being a flow chart showing the details of the step S15 of FIG. 5, FIG. 12 being a flow chart showing the details of the step S16 of FIG. 5, and FIG. 13 being a flow chart showing the details of the step S17 of FIG. 5.

FIG. 17 shows the relation between preliminary flashing the charging voltage of an integrating capacitor.

DESCRIPTION OF THE PREFERRED EMBODIMENTS

An automatic flash limiting apparatus in a camera according to a first embodiment of the present invention will hereinafter be described in detail with reference to FIGS. 1 to 13.

Figure 1:
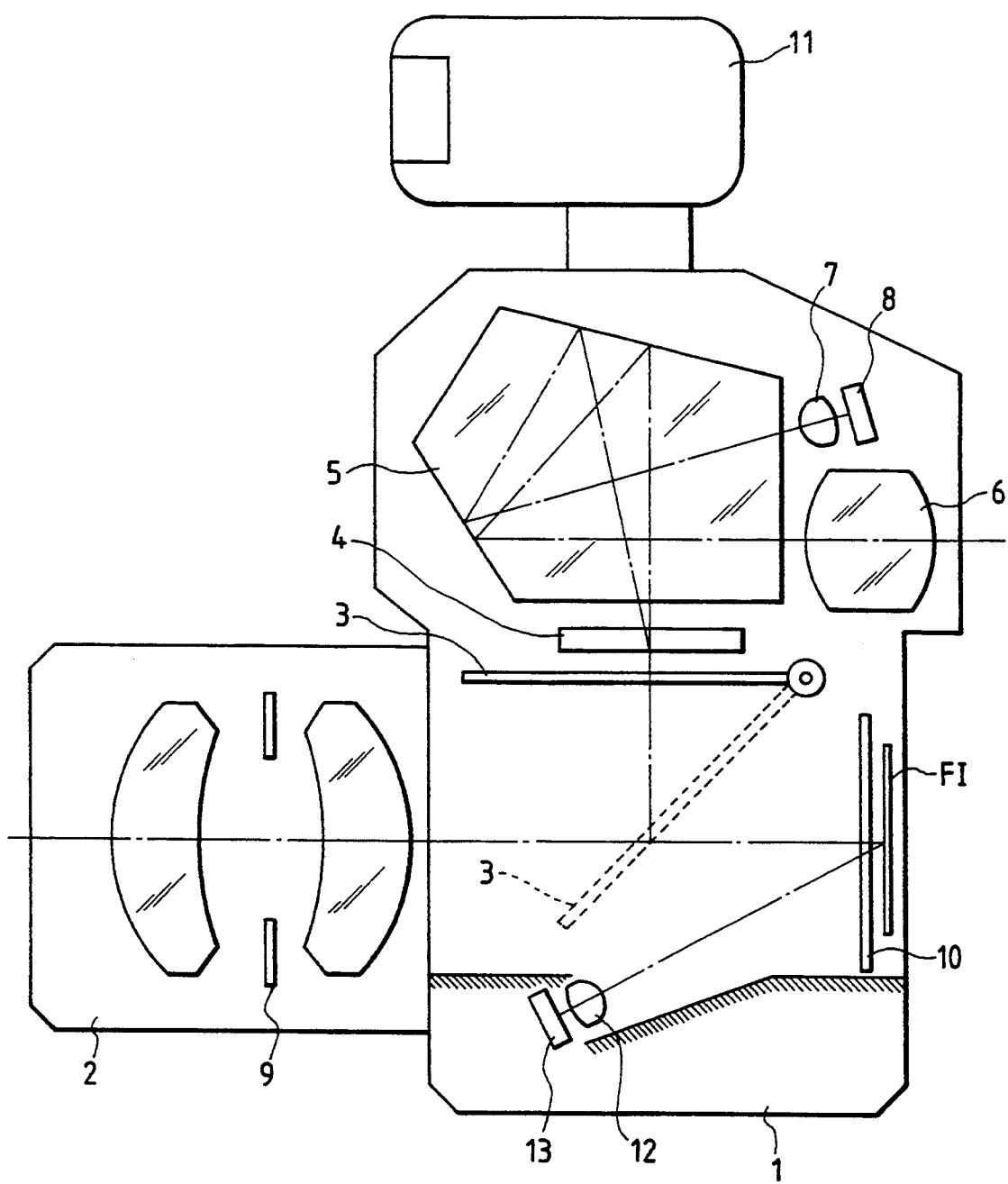
FIG. 1 shows the construction of an embodiment of an automatic flash control camera on which an automatic flash limiting apparatus according to the present invention is carried.
Figure 3:
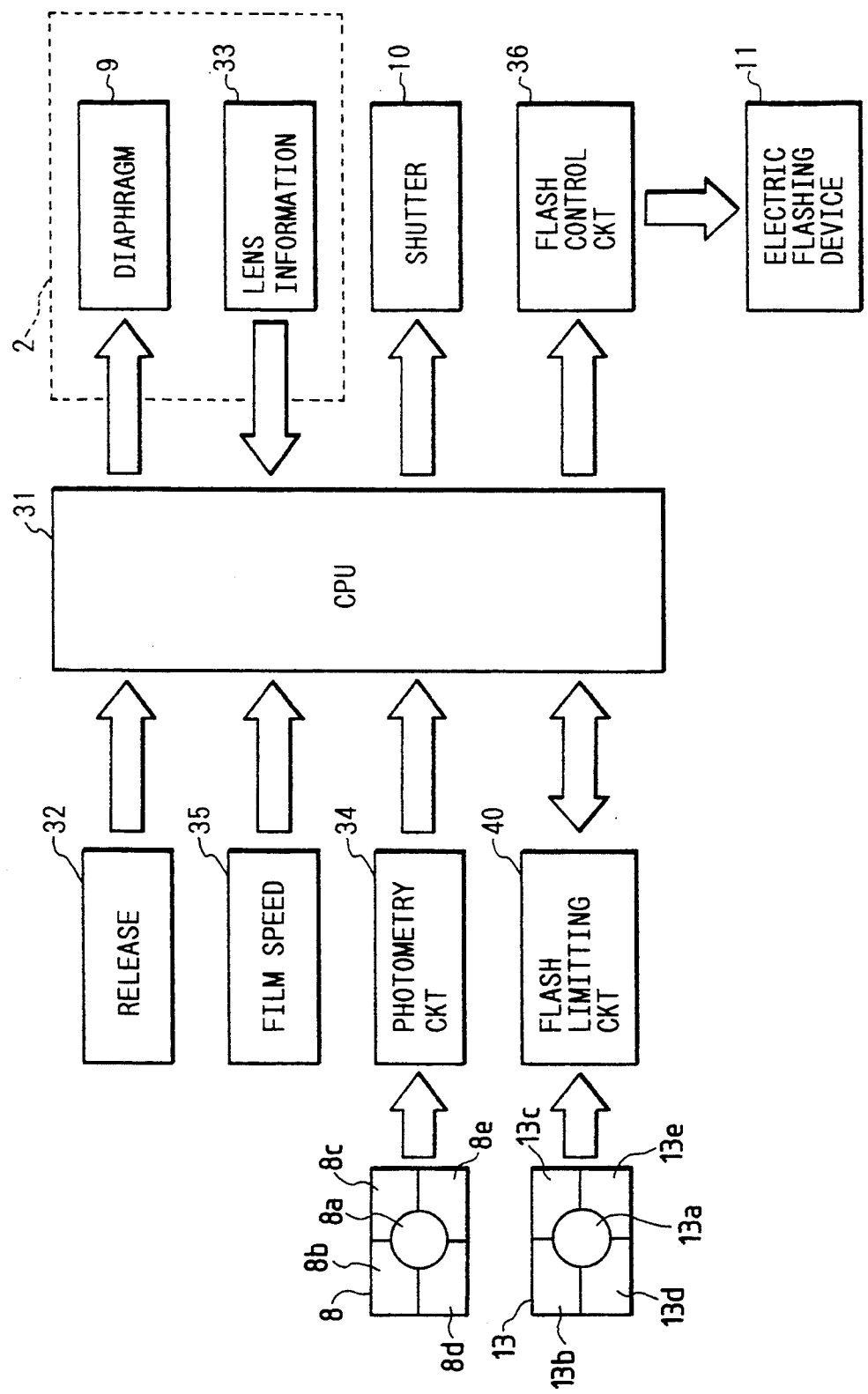
FIG. 3 is a block diagram of the control system of this automatic flash control camera.

FIG. 1 shows the construction of a TTL automatic flash control camera. A light beam (ordinary light) passed through a photo-taking lens 2 is reflected by a mirror 3 which is in a mirror down state indicated by broken lines, and a passes through a screen 4 and a pentaprism 5. Part of the light beam is directed to an eyepiece 6 and the other part of the light beam passes through a condensing lens 7 and is directed to a photometry element 8 for metering the ordinary light. Also, when a release button 32 shown in FIG. 3 is released, the mirror 3 is driven to its up position indicated by solid lines, whereafter a diaphragm 9 is stopped down and a shutter 10 is opened, whereby the object light passed through the photo-taking lens 2 is directed to film FI, which is thus exposed. Also, during flash photographing, an electric flashing device 11 effects main flashing to illuminate an object after the shutter 10 is opened, and the reflected light from the object passes through the photo-taking lens 2 to the surface of the film FI, and is reflected by the surface of the film FI, whereafter it is received by a flash limiting light receiving element 13 through a condensing lens array 12. Further, the camera of the present embodiment is capable of effecting preliminary flashing for examining the reflectivity distribution of the object field before the above-described main flashing, and the reflected light from the object field by this preliminary flashing is reflected by the blind of the shutter 10 before the shutter 10 is opened, and is received by the light receiving element 13.

Figure 2:
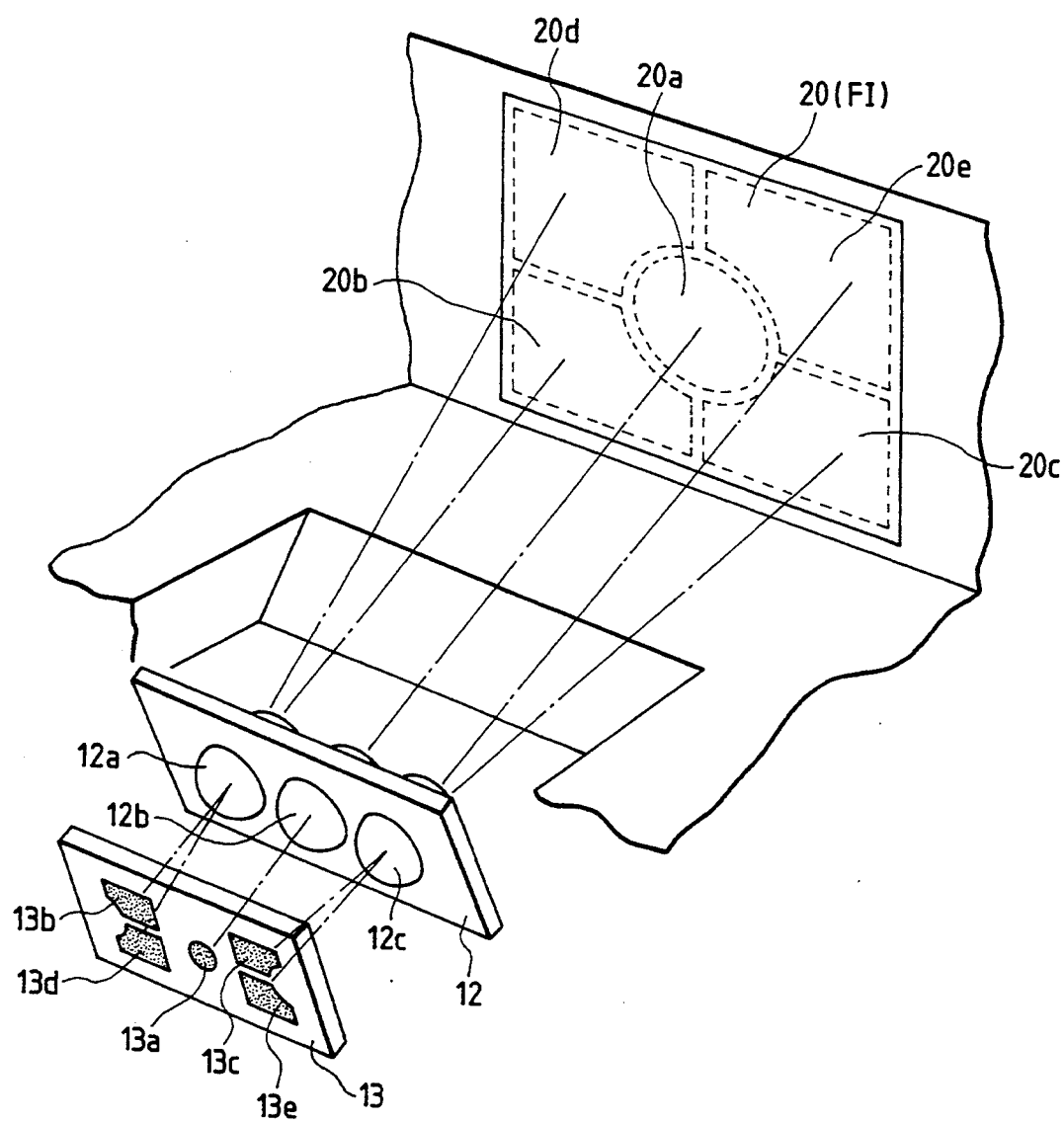
FIG. 2 is a perspective view showing a condensing lens array and a divisional light receiving element in this automatic flash control camera.

FIG. 2 is a perspective of a flash limiting optical system during flash emission. The light receiving element 13 comprises a divisional light receiving element 13a corresponding to a circular photometry area in the central portion of the object field, and divisional light receiving elements 13b–13e corresponding to photometry areas in the marginal portion of the object field, each of these photometry areas being of a shape comprising a rectangle cut away by an arc. The divisional light receiving elements 13a–13e are disposed on the same plane. Thus, in the present embodiment, split photometry is effected with the object field divided into five photometry areas. The condensing lens array 12 is an optical member having three lens portions 12a–12c corresponding to the three (left, middle and right) blocks of the divisional light receiving elements 13a–13e. The optical positional relation among the exposed area 20 of the surface of the film FI, the light receiving element 13 and the condensing lens array 12 is as shown in FIG. 2. When the exposed area 20 corresponding to one frame of the surface of the film FI, like the object field, is divided into five areas, i.e., a central circular portion 20a and four marginal rectangular portions 20b–20e, said three (left, middle and right) blocks of the light receiving elements 13a–13e shown in FIG. 2 face the left half, the center and the right half of the exposed area 20 via the three lens portions 12a–12c of the condensing lens array 12, as indicated by broken lines, respectively. Further, the five divisional light receiving elements 13a–13e of the light receiving element 13 are made corresponding in shape with the exposed area 20 and therefore divisionally meter the brightnesses of the five areas 20a–20e.

FIG. 3 shows a block diagram of a control system. A CPU 31 for controlling the sequence of the entire camera has connected thereto a release button 32 and the shutter 10 and also has connected thereto a diaphragm 9 in the photo-taking lens 2 and a lens information output circuit 33. Further, the CPU 31 has connected thereto a photometry circuit 34 for performing the photometry operation on the basis of the output from the photometry element 8 for metering ordinary light, a flash limiting circuit 40 for performing the flash limiting operation based on the outputs from the light receiving element 13, i.e., the divisional light receiving elements 13a–13e, an ISO speed detecting circuit 35 for reading the ISO speed of the mounted film FI from a DX code, and the light emission control circuit 36 of the electric flashing device 11.

The photometry element 8 for metering ordinary light, like the light receiving element 13, comprises five divisional photometry elements 8a–8e corresponding to the photometry areas of the object field. Also, the lens information output circuit 33 comprises a lens ROM storing therein information inherent to the lens (the open aperture value and the exit pupil distance), and a lens encoder for detecting the photographing distance from the focusing position of the photo-taking lens 2.

Figure 4:
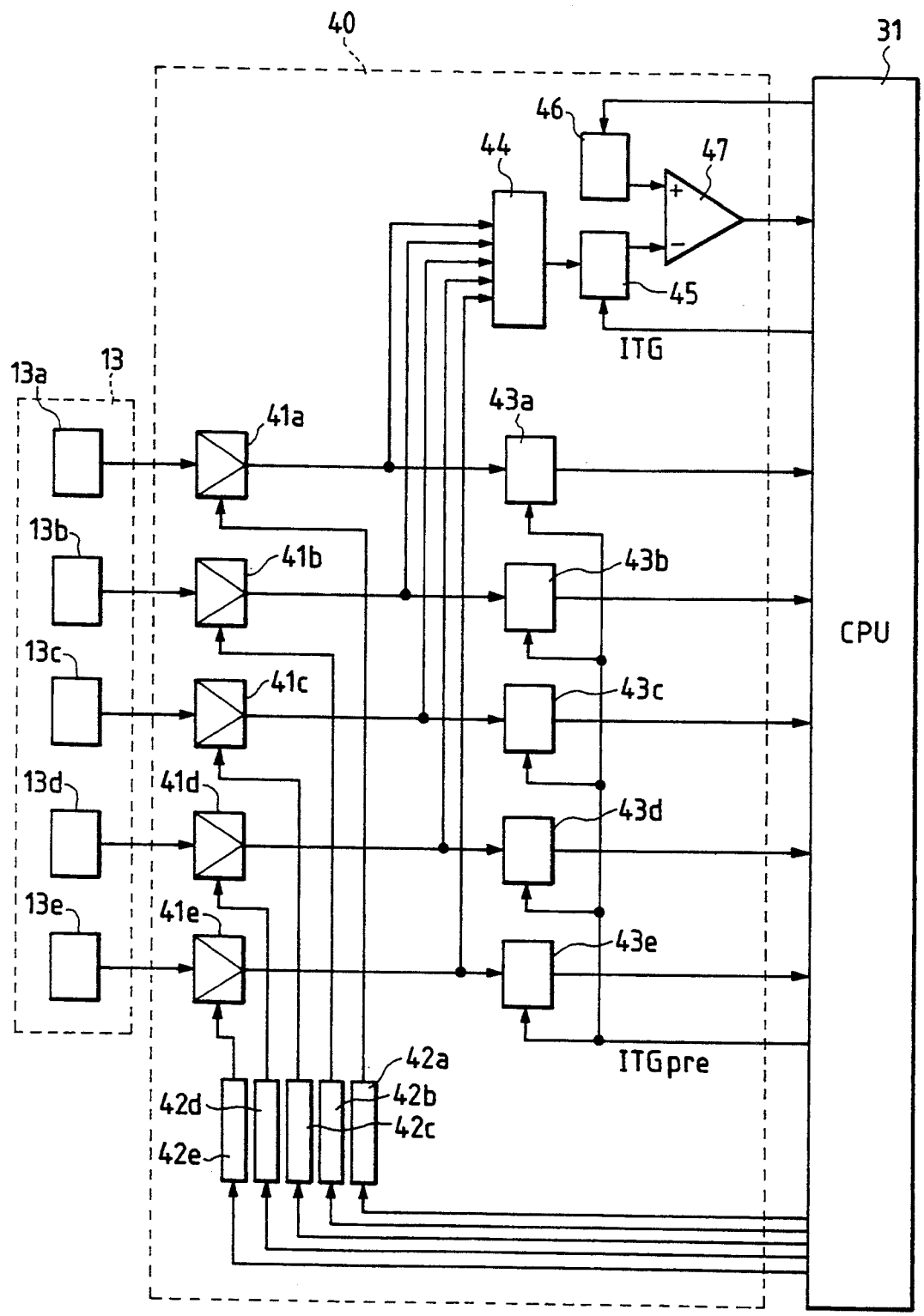
FIG. 4 diagrammatically shows the construction of a flash limiting circuit in this automatic flash control camera.

FIG. 4 shows the details of a flash limiting circuit 40. This flash limiting ciructit 40 has amplifiers 41a–41e for amplifying the outputs of the divisional light receiving elements 13a–13e, respectively, and gain setters 42a–42e for setting the amplification factors of the amplifiers 41a–41e, respectively, in response to a command from the CPU 31, the gain setters 42a–42e each including a D/A converter for converting the digital signal from the CPU 31 into an analog signal. The flash limiting circuit 40 also has integration circuits 43a–43e for integrating the outputs of the amplifiers 41a–41e, respectively, during preliminary flashing by time in response to a command from the CPU 31, an addition circuit 44 for adding the outputs of the amplifiers 41a–41e during main flashing, an integration circuit 45 for integrating the result of the addition by the addition circuit 44 by time in response to a command from the CPU 31, a converting circuit 46 for converting a flash limiting level (which will be described later in detail) as a digital signal calculated and output by the CPU 31 into an analog signal, and a comparator 47 for comparing this converted flash limiting level with the output of the integration circuit 45 and outputting a light emission stopping signal when the output of the integration circuit 45 reaches said flash limiting level.

The control procedure for the flash photographing operation by the CPU 31 will now be described with reference to flow charts shown in FIGS. 5 to 13.

Figures 5, 5A, 5B:
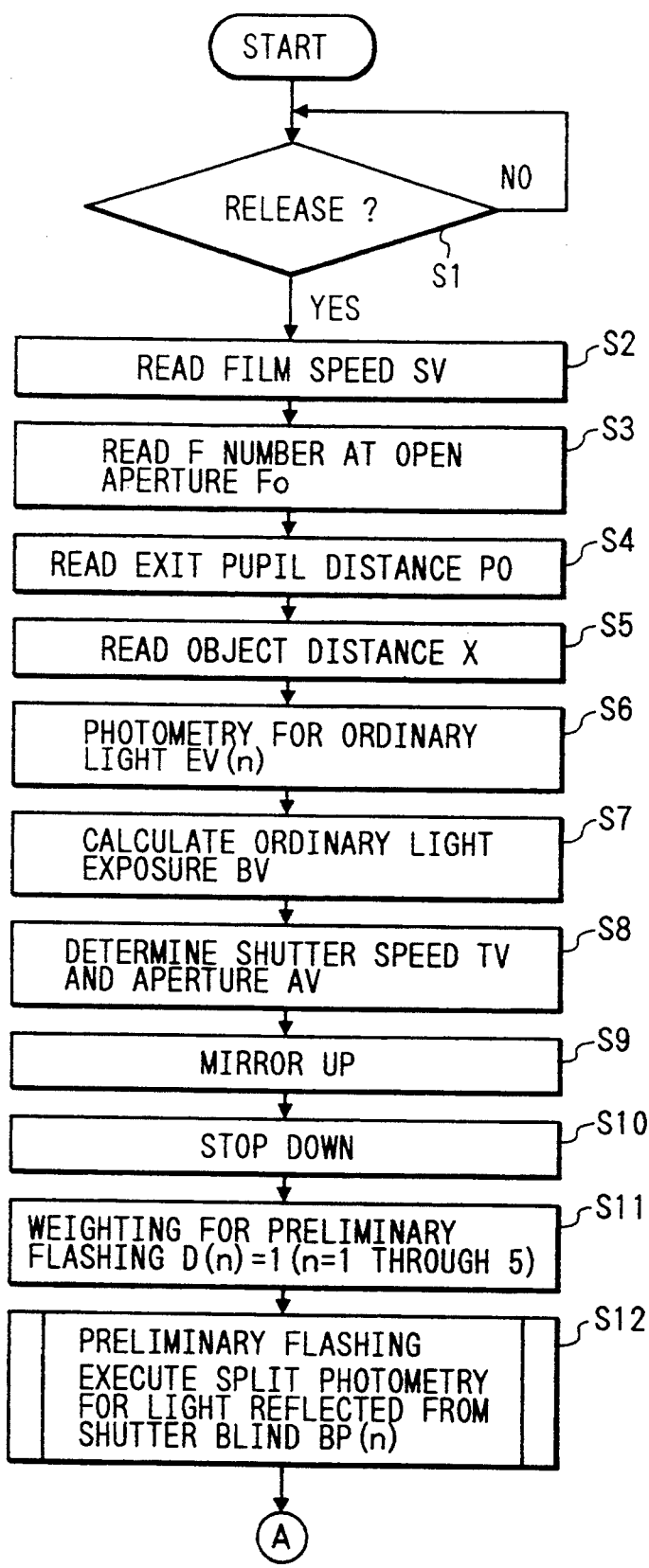
FIGS. 5A and 5B is a flow chart of the main routine executed by a CPU in this automatic flash control camera.
Figure 5B:
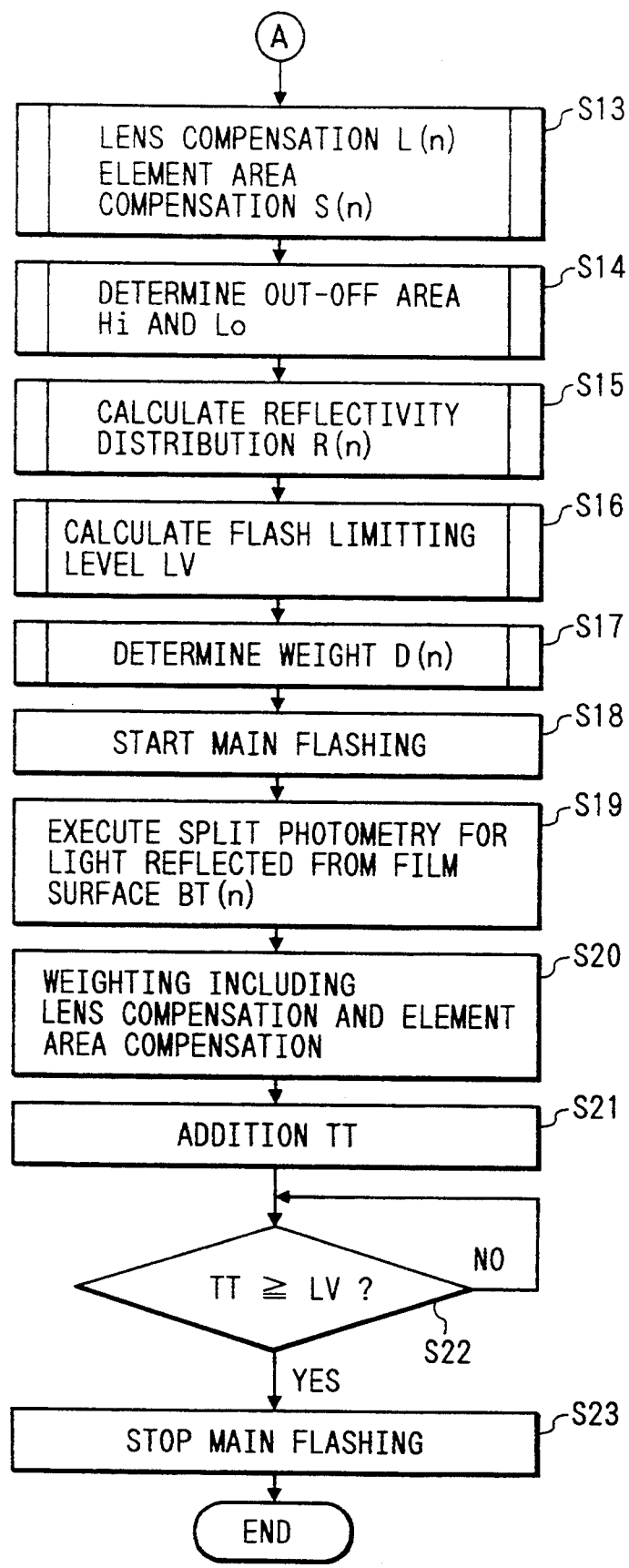

FIG. 5 is a flow chart of the main routine. When at a step S1, the release button 32 (FIG. 3) is fully depressed (released) subsequently to the half-depression, the processes of step S2 and so on are started.

First, at the step S2, the ISO speed SV of the mounted film is read from the ISO speed detecting circuit 35.

Then, at step S3, the F number at open aperture Fo is read from the lens information output circuit 33 of the photo-taking lens 2, and at a step S4, the exit pupil distance PO is read, and at a step S5, the object distance x is read. In the present embodiment, the object distance x is a value obtained by detecting the position of the lens driven by an automatic focusing device by an encoder with the half-depression of the release button 32, but it may also be a value obtained by a manual operation.

At a step S6, photometry for ordinary light is effected. That is, the outputs of the above-described five divisional photometry elements 8a–8e (FIG. 3) are introduced into the photometry circuit 34, and brightness values EV(n) (n=1–5) corresponding to the respective photometry areas which have been logarithmically compressed by this photometry circuit 34 are read. The values 1–5 of n in the present embodiment are made to correspond to the five divisional photometry elements 8a–8e or the five divisional light receiving element 13a–13e.

Then, at step S7, ordinary light exposure BV is calculated from the read brightness values EV(n). As this calculation system, use is made, for example, of the system as disclosed in Japanese Laid-Open Patent Application No. 1-285925 of the present assignee.

Advance is then made to a step S8, where shutter speed TV and aperture value AV are determined from the calculated ordinary light exposure BV and film speed SV.

Subsequently, at a step S9, the mirror 3 is moved up from the state indicated by broken lines in FIG. 1 to the state indicated by solid lines.

At a step S10, the diaphragm 9 is stopped down to the aperture value determined at the step S8.

At a step S11, 1 is given to all of the weights D(n) for the photometry outputs during preliminary flashing. Here, n=1–5.

At a step S12, a light emission signal is output to the light emission control circuit 36, whereby the electric flashing device 11 is made to effect light emission, i.e., preliminary flashing, at a predetermined small guide number. The light beam of this preliminary flashing is reflected by the object, passes through the photo-taking lens 2 and is imaged as a primary image on the blind of the shutter 10. This primary image is divided into five images, which are received by the five divisional light receiving elements 13a–13e, respectively, through the condensing lens array 12 of FIG. 2. The divisional light receiving elements 13a–13e give the amplifiers 41a–41e of the flash limiting circuit 40 (FIG. 4) signals corresponding to the quantities of light received thereby. The amplifiers 41a–41e weight the input signals by the weights D(n) set by the gain setters 42a–42e (all these weights D(n) being 1) and output them to the integration circuits 43a–43e. The CPU 31 outputs an operating signal to the integration circuits 43a–43e, which integrate the signals from the amplifiers 41a–41e in response to said operating signal and output them to the CPU 31. The signals thus output to the CPU 31 will hereinafter be called split photometry signals BP(n) (n=1–5). The above-described preliminary flashing is effected a plurality of times in succession as a rule. The details of this preliminary flashing will be described later with respect to three embodiments thereof and with reference to the flow charts of FIGS. 6, 7 and 8.

At a step S13, compensation is applied to the split photometry signals BP(n) based on the difference between the kinds of mounted photo-taking lenses 2 and a difference between the areas of the divisional light receiving elements 13a–13e. The details of this will be described later with reference to the flow chart of FIG. 9.

At a step S14, of the compensated split photometry signals BP(n), a photometry area (area Hi) considered to be an area of reflected light from an object of high reflectivity such as a mirror or a gold-leafed folding screen and a photometry area (area Lo) considered to be an area to which reflected light scarcely returns due to the absence of an object are excluded from the subject area of flash limiting during main flashing. That is, at the step S14, the areas to be cut off are determined. The details of this step will be described later with reference to the flow chart of FIG. 10.

At a step S15, with the other areas than the cut-off areas determined at the step S14 as the subject, the reflectivity distributions R(n) (n=1–5) of the object field to be photographed are calculated from the compensated split photometry signals BP(n). The details of this step will be described later with reference to the flow chart of FIG. 11.

At a step S16, the flash limiting level LV is calculated. The details of this step will be described later with reference to the flow chart of FIG. 12.

At a step S17, the weights D(n) (n=1–5) for the outputs from the divisional light receiving elements 13a–13e during main flashing are determined. The details of this step will be described later with reference to the flow chart of FIG. 13.

At a step S18, the shutter 10 is opened and when the shutter is fully opened, the main flashing of the electric flashing device 11 is started through the light emission control circuit 36.

At a step S19, the reflected light from the surface of the film FI is divisionally metered. That is, the irradiating light by main flashing is reflected by the object, passes through the photo-taking lens 2 and is reflected by the surface of the film FI, whereafter it is received by the divisional light receiving elements 13a–13e. The output signals of the divisional light receiving elements 13a–13e are given to the amplifiers 41a–41e (FIG. 4), respectively, of the flash limiting circuit 40.

At a step S20, the amplification factors of the amplifiers 41a–41e are set by the gain setters 42a–42e of the flash limiting circuit 40 in conformity with the weights D(n) determined at the step S17. That is, weighting is effected. The amplifiers 41a–41e amplify the output signals of the light receiving elements 13a–13e, respectively, at the set amplification factors and output them to the addition circuit 44. The addition circuit 44 adds the input amplified signals together.

At a step S21, an integration signal is output to the integration circuit 45. Thereby, the integration circuit 45 integrates the results of the addition in the addition circuit 44 by time.

At a step S22, the flash limiting level LV calculated at the step S16 is output to the converting circuit 46, which converts this into an analog siganl. The outputs of the converting circuit 46 and the integration circuit 45 are given to the comparator 47. The comparator 47 outputs a light emission stopping signal to the CPU 31 when the output of the integration circuit 45 reaches the flash limiting level LV. When this light emission stopping signal is input to the CPU 31, that is, when the decision step S22 is yes, at a step S23, the CPU 31 controls the light emission control circuit 36 of the electric flashing device 11 to thereby stop main flashing, and thereafter terminates the process.

In the construction of the above-described embodiment, the electric flashing device 11 constitutes flashing means, the light receiving elements 13a–13e and the condensing lens array 12 together constitute split photometry means, and the CPU 31 constitutes preliminary flashing control means, main flashing control means and calculation means.

FIG. 6 is a flow chart showing the details of a first embodiment of the step S12 (FIG. 5).

In this embodiment, at a step S101, the guide number $GN_1$ of the first preliminary flashing is first set to 5.

At a step S102, the first preliminary flashing is started.

At a step S103, split photometry for the light reflected from the shutter blind is executed. Values obtained by the split photometry are BP(n) (n=1–5).

At a step S104, the first preliminary flashing is stopped when the greatest one of the five BP(n) has reached a predetermined amount.

That is, flash limiting is effected. As regards BP(n), the value when the preliminary flashing is stopped is memorized.

At a step S105, whether the first preliminary flashing has been limited is judged. If it is limited, that is, if full flashing is not effected, advance is made to a step S107, and if not so, advance is made to a step S106.

At the step S106, 0 is given to FLG and advance is made to a step S114, where return is made to the main routine of FIG. 5.

At the step S107, 1 is given to FLG and advance is made to a step S108.

At the step S108, 2 is given to e and advance is made to a step S109.

At the step S109, $(x \cdot 2^{AV/2})/(2^{3-1})$ is given to the guide number GNe of the eth preliminary flashing, and advance is made to a step S110. x is the object distance, and AV is the aperture value.

At the step S110, the eth preliminary flashing is started and advance is made to a step S111.

At the step S111, flash limiting is effected as in the case of the step S104 while split photometry for the light reflected from the shutter blind is executed. Values obtained by the split photometry are BPF(n) (n=1–5).

When advance is made to a step S112, whether the eth preliminary flashing has been limited is discriminated. If it has not been limited, that is, if full flashing has been done, the value of BPF(n) immediately after the full flashing is memorized and advance is made to a step S114, where return is made to the main routine. If said preliminary flashing has been limited, advance is made to a step S113, where e+1 is substituted for e and return is made to the step S109, and the routine of the steps S109–S113 is repeated while the guide number is successively decreased until full flashing is done. At a point of time whereat full flashing has been done, BPF(n) is memorized and advance is made to the step S114, where return is made to the main routine.

FIG. 7 is a flow chart showing the details of a second embodiment of the step S12 (FIG. 5). According to this embodiment, preliminary flashing is not limited and therefore, control is simple as compared with the first embodiment.

At a step S201, 0 is given to e and advance is made to a step S202.

At the step S202, e+1 is given to e and advance is made to a step S203.

At the step S203, $5/(2^{e-1})$ is given to the guide number GNe of the eth preliminary flashing, and advance is made to a step S204.

At the step S204, the eth preliminary flashing is started, and advance is made to a step S205.

At the step S205, split photometry for the light reflected from the shutter blind is executed. At this time, flash limiting is not effected. Values obtained by the split photometry are BPF(n) (n=1–5).

When advance is made to a step S206, BPF(n) is substituted for BP(n), and advance is made to a step S207.

At the step S207, whether there have been elements saturated by the eth preliminary flashing (exactly, the integration circuits 43a–43e of FIG. 4) is discriminated. If there has been no such element, advance is made to a step S208, where 1 is given to FLG, and advance is made to a step S209, where return is made to the main routine. If there has been any element saturated, advance is made to the step S202, where the routine of the steps S202–S207 is repeated while the guide number is successively decreased until there are no saturated elements. At a point of time whereat the number of saturated elements has become zero, GNe and BPF(n) are memorized, and advance is made to the step S208, where 1 is given to FLG, and advance is made to the step S209, where return is made to the main routine.

Figure 8:
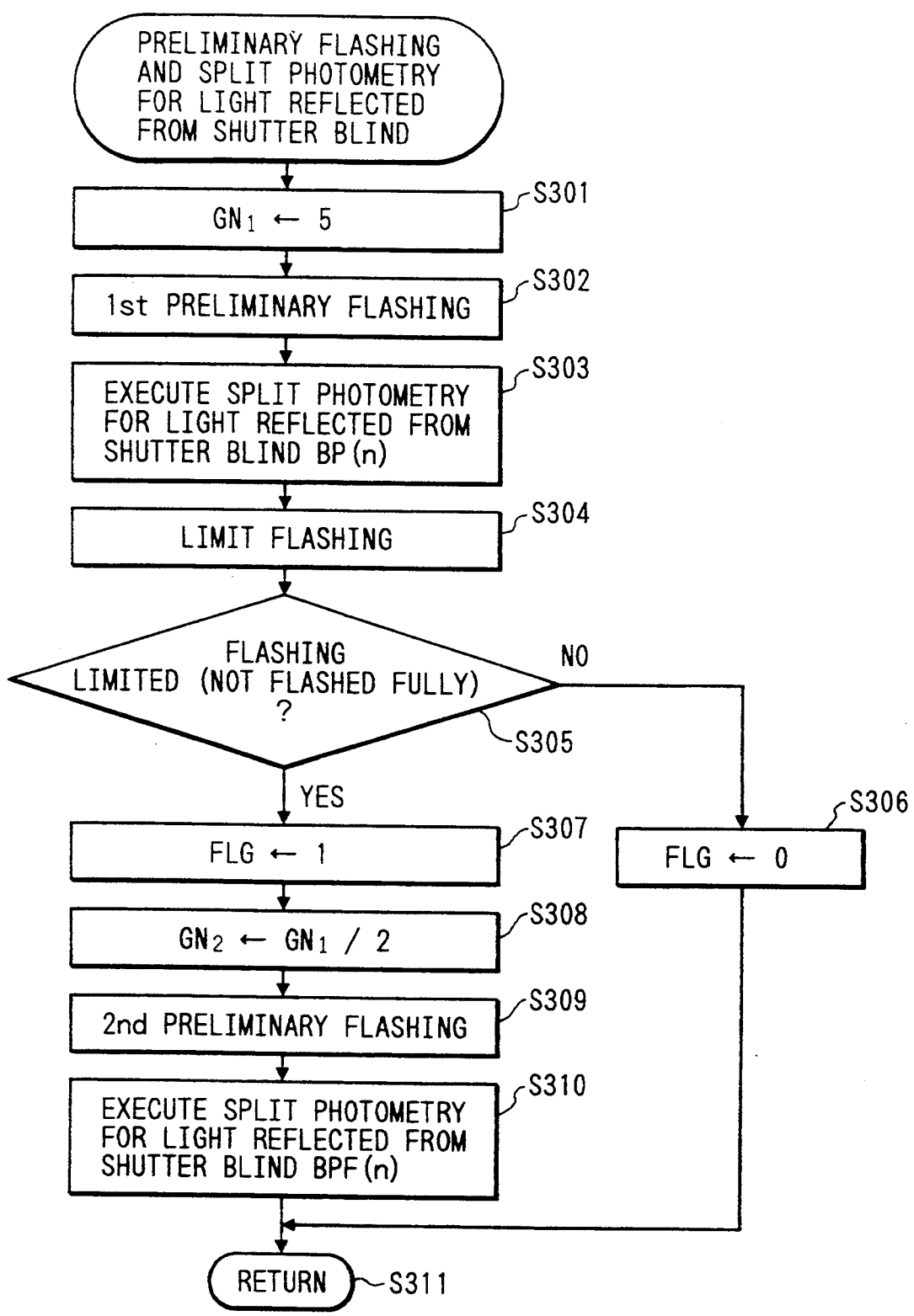

FIG. 8 is a flow chart showing the details of a third embodiment of the step S12 (FIG. 5). According to this embodiment, flash limiting is effected with the number thereof restricted and therefore, as compared with the first embodiment, time lag decreases and flashing energy may be small.

At a step S301, the guide number $GN_1$ of the frist preliminary flashing is set to 5.

At a step S302, the first preliminary flashing is started.

At a step S303, split photometry for the light reflected from the shutter blind is executed. Values obtained by the split photometry are BP(n) (n=1–5).

At a step S304, the first preliminary flashing is stopped when the greatest one of five BP(n) reaches a predetermined amount. That is, flash limiting is effected. The values of BP(n) when the preliminary flashing is stopped are memorized.

At a step S305, whether the first preliminary flashing has been limited is discriminated. If it has been limited, that is, if full flashing is not effected, advance is made to a step S307, and if not so, advance is made to a step S306.

At the step S306, 0 is given to FLG, and advance is made to a step S311, where return is made to the main routine.

At the step S307, 1 is given to FLG, and advance is made to a step S308.

At the step S308, $GN_1/2$ is given to the guide number $GN_2$ of the second preliminary flashing, and advance is made to a step S309.

At the step S309, the second preliminary flashing is started and advance is made to a step S310.

At the step 310, split photometry for the light reflected from the shutter blind is executed. At this time, flash limiting is not effected. That is, the second preliminary flashing is done fully at the guide number $GN_2$. Values obtained by the split photometry are BPF(n) (n=1–5). The values of BPF(n) are then memorized and advance is made to a step S311, where return is made to the main routine.

Figure 9:
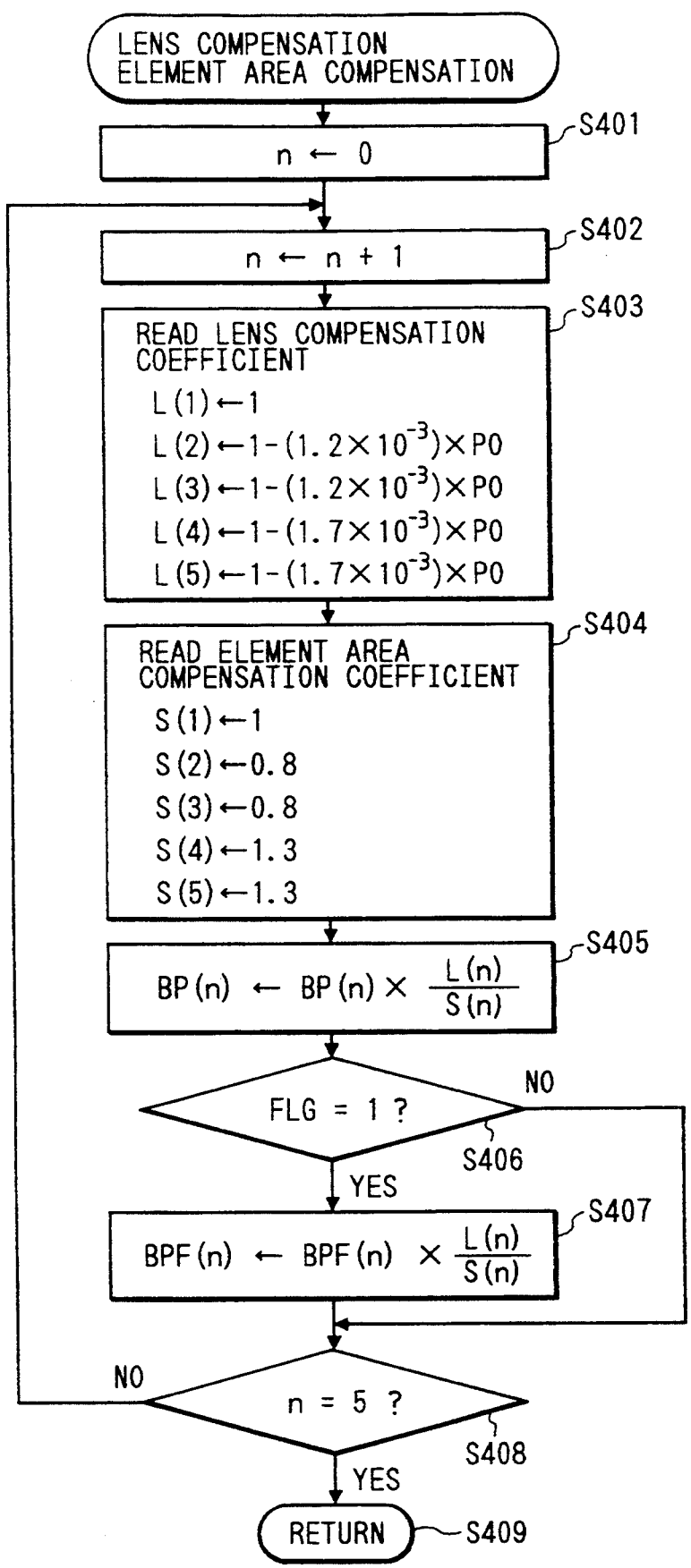

FIG. 9 is a flow chart showing the details of the lens compensation process and area compensation process of the step S13 of FIG. 5.

First, at step S401, n is made into n=0. Then, at step S402, n is stepped by 1, and at a step S403, the lens compensation coefficients L(n) are calculated on the basis of expressions shown. Here, PO indicates the exit pupil distance of the photo-taking lens 2. Subsequently, at a step S404, element area compensation coefficients S(n) prestored in a memory are read, and at a step S405, split photometry signals BP(n) are compensated for on the basis of the following expression:

$$BP(n) \rightarrow BP(n) \cdot L(n)/S(n) \quad (1)$$

If at a step S406, FLG=1, advance is made to a step S607, where split photometry signals BPF(n) are compensated for on the basis of the following expression:

$$BPF(n) \rightarrow BPF(n) \cdot L(n)/S(n) \quad (2)$$

and then advance is made to a step S408. If at the step S406, FLG is not FLG=1, advance is made to the step S408.

These processes are carried out until at the step S408, n=5 is judged, whereby the compensation by the lens and the element area is effected for all of the split photometry signals BP(n) and BPF(n) of the five photometry areas.

That is, the light receiving conditions of the above-described divisional light receiving elements 13a–13e differ depending on the exit pupil distance PO of the photo-taking lens 2 and the areas and positions of the divisional light receiving elements 13a–13e. So, in the process of FIG. 9, the above-described compensation processes are carried out to evaluate the photometry signals of all light receiving elements under the same condition.

Figure 10:
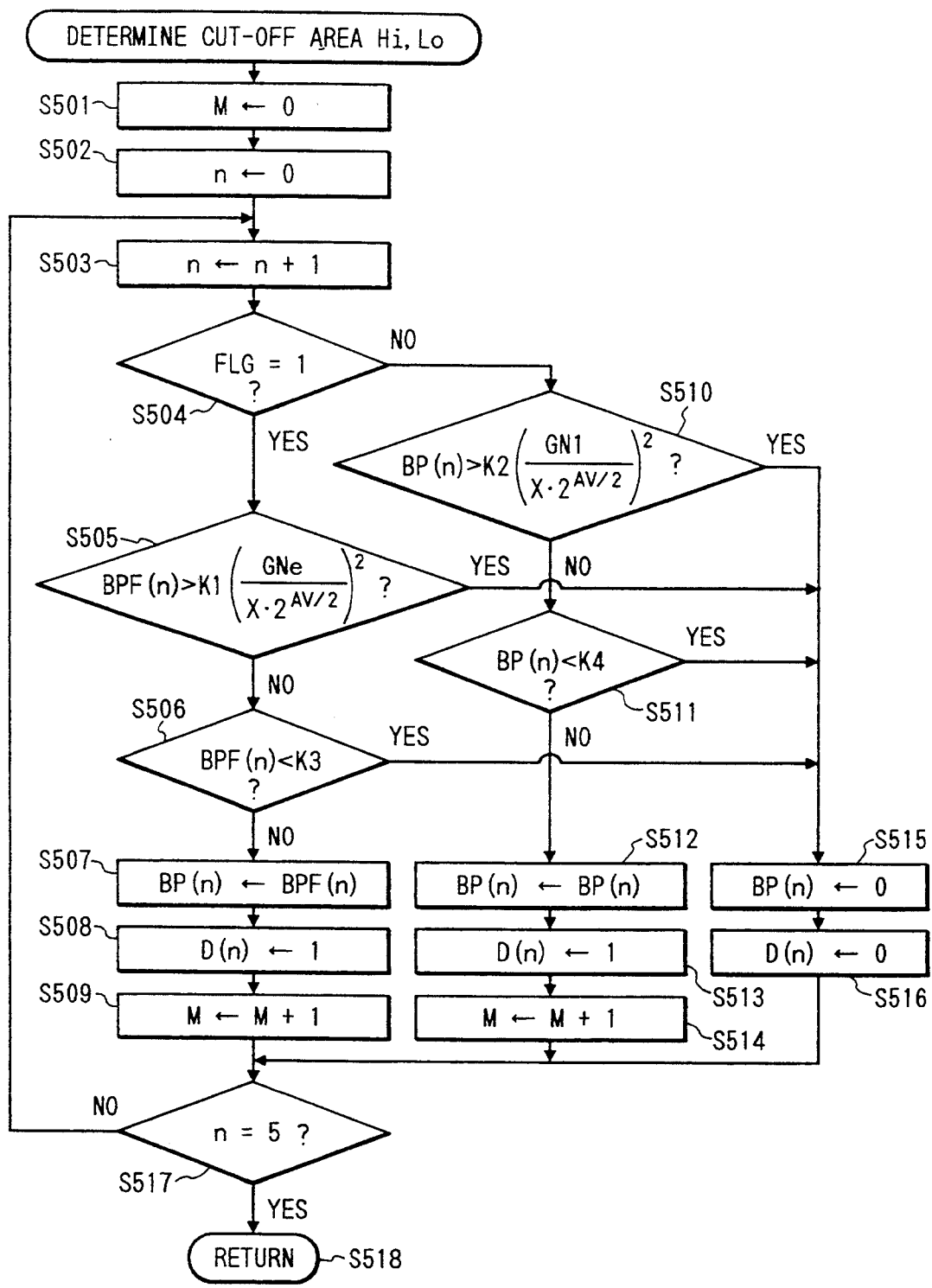

FIG. 10 is a flow chart showing the Hi and Lo cutting-off process (the effective photometry area determining process) of the step 14 of FIG. 5.

First, at step S501 and S502, M and n are rendered into M=0 and n=0, respectively.

Then, at step S503–S517, the following processes are successively carried out for five split photometry signals BP(n) and BPF(n) (the values compensated for at the step S13).

At the step S503, n is stepped by 1.

At the step S504, whether FLG=1 is discriminated, and if FLG=1, advance is made to the step S505, and if not FLG=1, advance is made to the step S510.

At the step S505, whether the split photometry signals BPF(n) satisfy $$BPF(n) > K1 \cdot \left( \frac{GNE}{x \cdot 2^{AV/2}} \right)^2 \quad (3)$$

is judged. Here, GNe is the guide number during the eth preliminary flashing, AV is the aperture value (apex value), x is the object distance and K1 is a constant. If the decision of step S505 is yes, advance is made to the step S515, where Hi is cut off and the split photometry signals BP(n) are set zero and at the step S516, the weight D(n) of the photometry signals BP(n) is set zero, and advance is made to the step S517. If at the step S504, FLG is not FLG=1, advance is made to the step S510, where whether the split photometry signals BP(n) satisfy $$BP(n) > K2 \cdot \left( \frac{GN_1}{x \cdot 2^{AV/2}} \right)^2 \quad (4)$$

is judged. Here, $GN_1$ is the guide number during the first preliminary flashing, AV is the aperture value (apex value), x is the object distance and K2 is a constant. If the decision of step S510 is yes, advance is made to the step S515, where Hi is cut off and the split photometry signals BP(n) are set to zero and at the step S516, the weight D(n) of the photometry signals BP(n) is set to zero, and advance is made to the step S517.

Description will now be made in detail of the significance of the process of advancing from the step S505 or S510 to the step S515.

For example, when an object of high reflectivity such as a mirror or a gold-leafed folding screen exists in the object field or when an object lies forwardly of the main object, the split photometry signals BP(n) and BPF(n) of that area become very great as compared with the other objects. Accordingly, when the flash limiting operation is performed with these photometry signals taken into account, there is the possibility of the main object becoming under-exposed. So, the above-described process is a process for performing the flash limiting operation, excluding the photometry signals for such an object of high reflectivity. That is, when the photometry signals BP(n) and BPF(n) are greater than the comparative values of the abovementioned expressions (3) and (4), the quantity of light is judged to be excessively great (the Hi area) and the photometry signals BP(n) are set zero and the weight D(n) is also set zero. These comparative values are based on the aperture value AV and object distance x during preliminary flashing.

It will be appreciated that even if the guide number of preliminary flashing is constant, the values of photometry signals differ depending on the aperture value AV and object distance x, and the greater the object distance or the more stopped down the aperture, the smaller the values assumed by the photometry signals will become. If the comparative values for judging whether said quantity of light is excessively great were constant values, there would be a possibility that the object which should be excluded is not excluded in a state in which the object distance is great and the aperture is stopped down, and there would be a possibility that the photometry signals which should not be excluded are excluded in a state in which the object distance is short and the aperture is open.

So, in the present embodiment, the comparative values are determined by the above-mentioned expressions, so that the shorter the object distance or the more adjacent the aperture value is to the open side, the higher the comparative values become. Therefore, the above-noted inconvenience is completely eliminated.

Returning to FIG. 10, if the decision in step S505 is negative, advance is made to the step S506, where whether the photometry signals BPF(n) are smaller than the comparative value K3 is judged. If the decision in step S506 is affirmative, Lo is cut off and advance is made to the step S515. If the decision is negative, advance is made to the step S507. Likewise, if the decision in step 510 is negative, advance is made to the step 511, where whether the photometry signals BP(n) are smaller than the comparative value K4 is judged. If the decision in step S511 is affirmative, Lo is cut off and advance is made to the step S515, and if the decision is negative, advance is made to the step 512.

These processes are ones for excluding the photometry signals BP(n) and BPF(n) to prevent the main object from being over-exposed when, for example, there is a large vacant space behind the main object and reflected light is little and the photometry signals BP(n) and BPF(n) are too low. In such case, the photometry signals BP (n) and BPF (n) originally are small and therefore, the comparative values need not be changed in conformity with the aperture value AV and the object distance x, but may be constants.

The photometry signals BPF(n) which have not been excluded at either of the steps S505 and S506 are substituted for BP(n) at the step S507, and then at the step S508, the weight corresponding to the photometry signals BP(n) is set to 1. At the step S509, the variable M is stepped by 1. Likewise, the photometry signals BP(n) which have not been excluded at either of the steps S510 and S511 are kept at their respective values at the step S512, and then at the step S513, the weight corresponding to the photometry signals BP(n) is set to 1. At the step S514, the variable M is stepped by 1.

Here, among the five photometry areas in the object field, the areas in which the photometry signals BP(n) and BPF(n) have not been excluded correspond to the effective photometry areas. Also, the variable M represents the number of the photometry signals which have not been excluded, i.e., the effective photometry areas.

Figure 11:
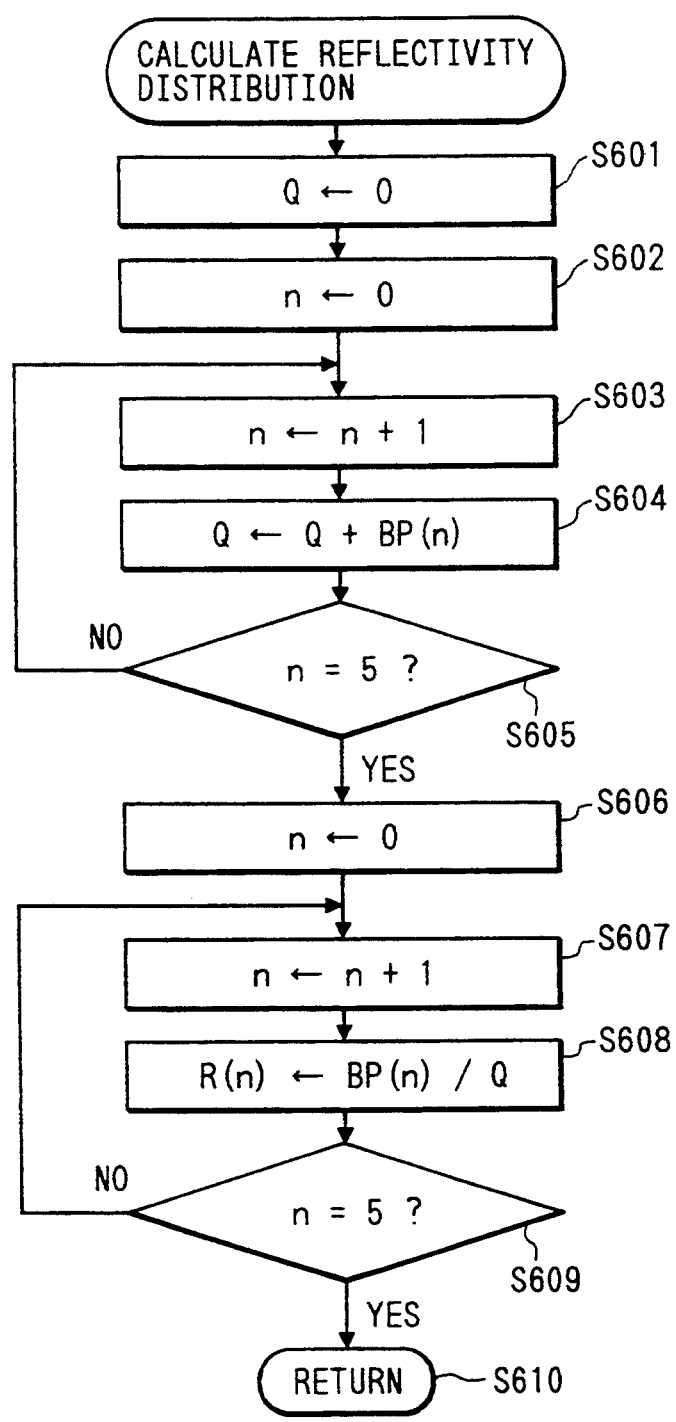

FIG. 11 is a flow chart showing the details of the process of the step S15 of FIG. 5 for determining the reflectivity distributions R(n) of the respective photometry areas of the object field.

First, at step S601 and S602, Q and n are set to Q=0 and n=0, respectively.

Then, at step S603–S605, the sum total Q of the photometry signals BP(n) is found. The photometry signals representing the excessively great quantity of light and the excessively small quantity of light are made zero by the process of the step S14 and thus, substantially, only the photometry signals of the effective photometry areas are added.

Subsequently, at a step S606, n is set to n=0.

At step S607–S609, the reflectivity distributions R(n) of the photometry signals BP(n) when the total of the reflectivities of the photometry signals BP(n) is 1 are determined on the basis of the expression at the step S608. At this time, the reflectivity distributions of the photometry signals excluded at the step S14 become zero as a matter of course.

Figure 12:
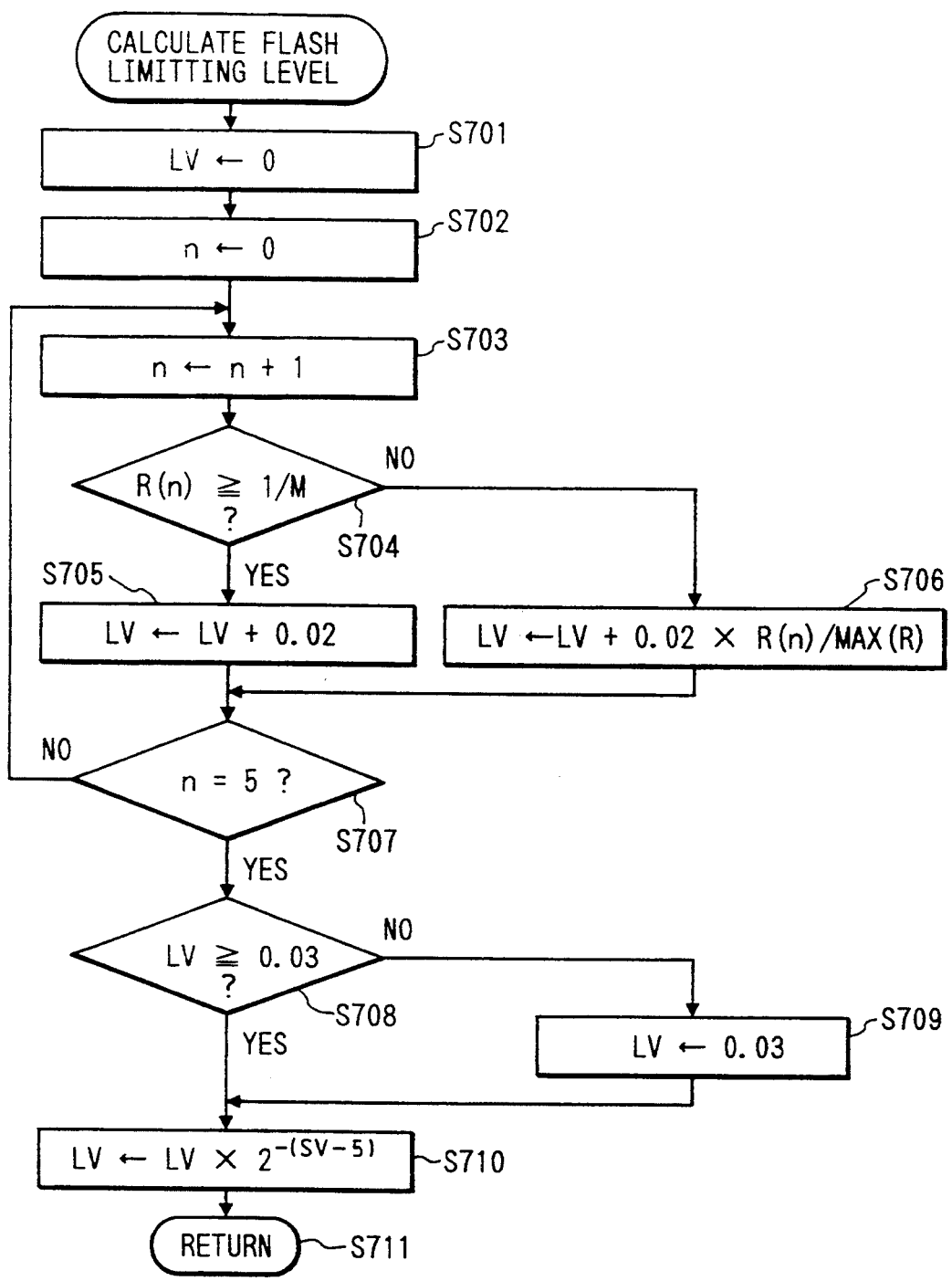

FIG. 12 is a flow chart showing the details of the flash limiting level calculation process of the step S16 of FIG. 5. Here, the flash limiting level is indicative of the level of the photometry signal which should stop the main flashing of the electric flashing device 11 during flash photographing.

First, at a step S701, the flash limiting level LV is set to zero.

Then, at step S702, n is set to n=0, and advance is made to a step S703.

At step S703–S707, the process of determining the flash limiting level LV in conformity with the number M of the effective photometry areas and the reflectivity distributions R(n) is carried out. That is, at the step S704, whether the reflectivity distributions R(n) of the photometry signals are equal to or greater than 1/M (which corresponds to the average value of the reflectivity distributions R(n) of the effective photometry areas) is judged, and if the answer is affirmative, that is, if the reflectivity distributions R(n) of the photometry areas are equal to or greater than the average value, advance is made to the step S705, where the flashing limiting level LV is stepped by 0.02. Also, if the decision in step S704 is negated, that is, if the reflectivity distributions R(n) of the photometry areas are less than the average value, advance is made to the step S706, where the flash limiting level LV is stepped by "0.02×R(n)/MAX(R)" (MAX(R) being the maximum value of R(1)–R(5)).

The above-described process is that when design is made such that the flash limiting level LV is 0.02×5=0.1 when the five reflectivity distributions R(n) are all equal to one another, and by this process, the flash limiting level LV is determined in conformity with the number (area) M of the effective photometry areas and the reflectivity distributions R(n).

Advance is then made to a step S708, where whether the determined flash limiting level LV is equal to or greater than 0.03 is judged. If the answer is affirmative, advance is made to a step S710, and if the answer is negative, at a step S709, the flash limiting level LV is rendered equal to 0.03, and advance is made to a step S710. This is a measure for limiting the flash limiting level LV to 0.03 or greater and preventing the flash limiting level LV from becoming too low and resulting in under-exposure. At the step S710, the flash limiting level LV is converted so as to correspond to the ISO speed (read at the step S2) SV.

Figure 13:
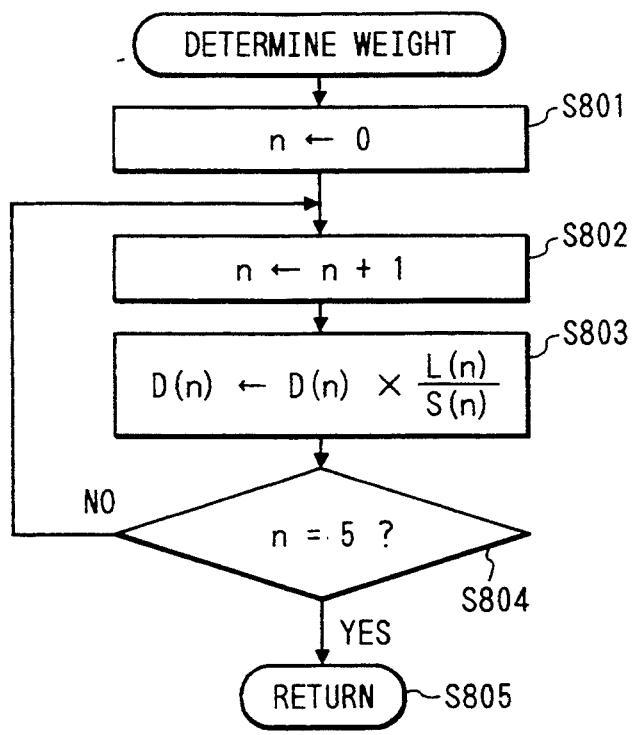

FIG. 13 is a flow chart showing the details of the step S17 of FIG. 5, and the process of determining the weight for compensating for the photometry signals during main flashing which is effected later.

First, at a step S801, n is set to n=0.

Then, at setp S802–S804, the weights D(n) (determined at the step S14 and being 1 or 0) corresponding to the photometry signals are multiplied by L(n)/S(n) to thereby provide new weights. Here, L(n) is the lens compensation coefficient obtained at the step S13, and S(n) is the area compensation coefficient.

In the present embodiment, the flash limiting level LV is made variable in conformity with the above-described reflectivity distributions R(n) and therefore, the weights need not be determined in conformity with the reflectivity distributions R(n). Accordingly, here, the weights are determined only by the lens compensation coefficient L(n) and the area compensation coefficient S(n). Also, the weights corresponding to the photometry signals excluded at the step S14 become zero as a matter of course.

Where the embodiment shown in FIG. 6 is adopted during preliminary flashing, with regard to the process of determining the effective photometry areas at the step S14, the Hi and Lo cut-off areas are determined on the basis of BPF(n) during full flashing and the then current guide number, and with regard to the calculation of the flash limiting level LV at the step S16, BP(n) during the first preliminary flashing may be used. When the first preliminary flashing is limited, the absolute value thereof is inaccurate, but the guide number is great and therefore, the reliability of the ratio of BP(n) is high. In contrast, when full flashing is effected during the eth preliminary flashing, the absolute value thereof is accurate, but the guide number is small and a noise component or the like becomes more significant so that the reliability of the ratio of BPF(n) is low. Thus, with regard to the step S14 which requires the absolute values of split photometry signals, the split photometry signals when full flashing is effected are used, whereby the Hi and Lo cut-off areas are determined at high accuracy. Further, with regard to the step S16 which requires the ratio of the split photometry signals, the split photometry signals during the first preliminary flashing are used, whereby the accuracy of the flash limiting level LV obtained by calculation is enhanced.

An automatic flash limiting apparatus in a camera according to a second embodiment of the present invention will now be described in detail.

Figure 14:
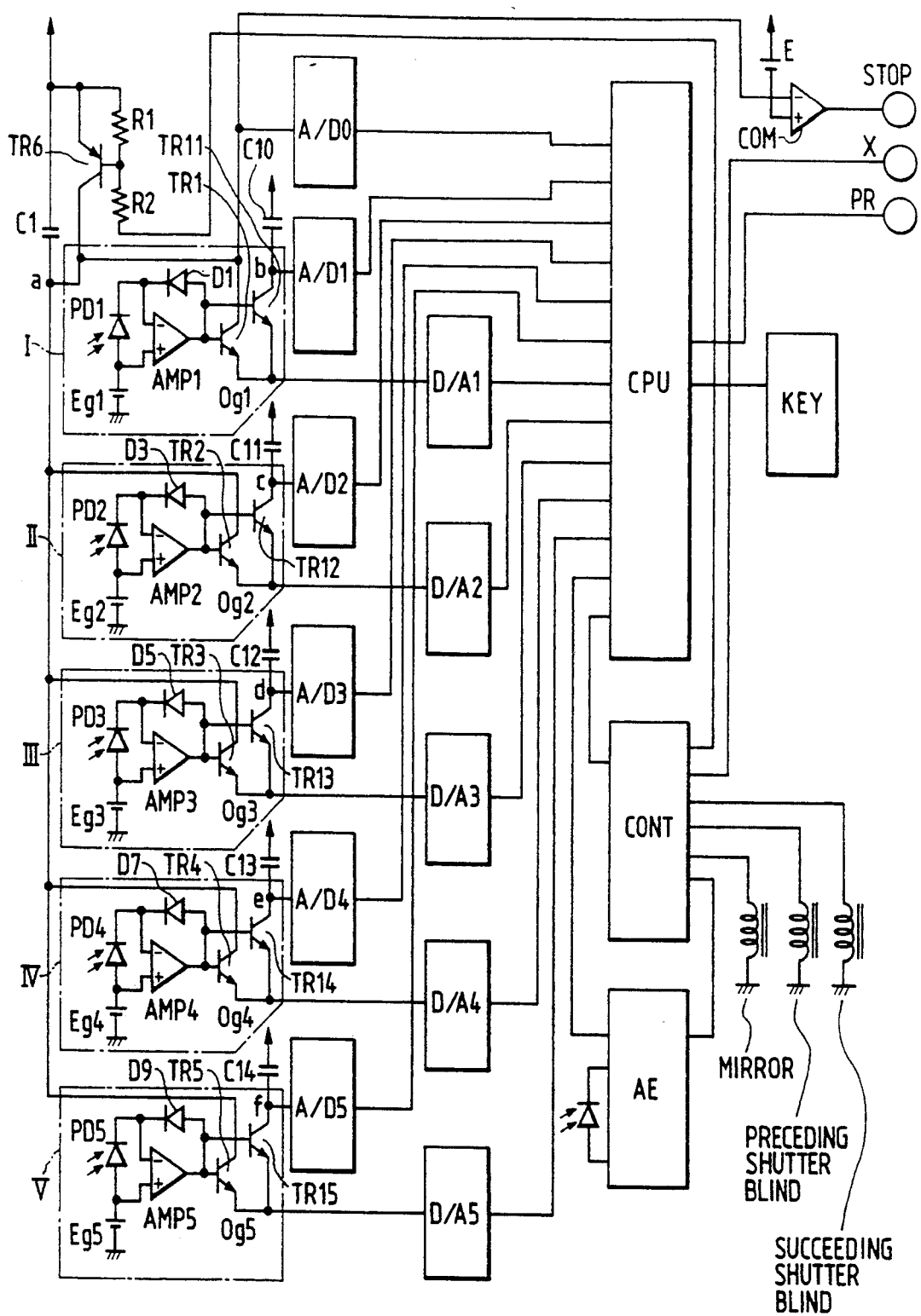
FIG. 14 is a block circuit diagram showing a camera to which a stroboscopic photometry device according to the present invention is applied.

FIG. 14 is a block circuit diagram showing an embodiment of the camera to which this automatic flash limiting apparatus is applied.

An input device KEY reads the state of the switch of the camera such as a release switch and transmits it to a microcomputer CPU.

The CPU effects ordinary light photometry, the automatic flash control of the flashing device, release driving, etc. When ordinary light photometry is to be effected, the CPU transmits a photometry mode such as conventional multiphotometry or spot photometry to an ordinary light photometry circuit AE, receives the result of the photometry from the ordinary light photometry circuit AE, and displays it on a display device, not shown. In the case of the automatic flash control of the flashing device, the CPU sends numerical values corresponding to the gains of photometry circuits I-V which will be described later to digital-analog converters D/A1-D/A5, and receives the result of the photometry from analog-digital converters A/D1-A/D5. Also, when the mode is the flash photographing mode, the CPU "H"-controls and "L"-controls a preliminary flashing terminal PR, and outputs a preliminary flashing start signal to the electric flashing device which will be described later. When release driving is to be effected, the CPU commands a camera controller CONT to effect release driving. A flashing device detector, not shown, is connected to the CPU, and detects whether the flashing device is connected, whether the power source switch of the flashing device is closed and whether the flashing device is ready to flash, thereby changing the shutter time and the photometry mode.

The ordinary light photometry circuit AE meters ordinary light in the photometry mode transmitted from the CPU, transmits the result of the photometry to the CPU and the calculates the shutter speed from the result of the photometry, and sends it to the camera controller CONT.

The camera controller CONT performs release operations such as mirror up, movement of the preceding (leading) shutter blind and movement of the succeeding (trailing) shutter blind by a release command from the CPU. The shutter speed at this time is controlled by a signal sent from the ordinary light photometry circuit AE, but in the case of flash photographing, the shutter speed is controlled to synchro shutter time or less by a command from the CPU. Also, during flash photographing, an X contact (not shown) is closed with the full opening of the shutter blind, and a flashing start signal is output to an X terminal. Further, the camera controller CONT ON-OFF controls a transistor TR6 in response to the opening and closing of the X contact, and controls the charging and discharging of an integration capacitor C1.

The digital-analog converters D/A1, D/A2, D/A3, D/A4 and D/A5 convert numerical values received from the CPU into analog voltages and output the analog voltages to stroboscopic photometry circuits I-V.

The analog-digital converters A/D0, A/D1, A/D2, A/D3, A/D4 and A/D5 read the outputs of the photometry circuits I-V, convert them into digital values and output the digital values to the CPU. Also, integration capacitors C1 and C10-C14 connected to the analog-digital converters are caused to discharge before photometry is started.

The camera according to the present embodiment has five photometry circuits for the flashing device, i.e., a photometry circuit I comprising a reference voltage source Eg1, a light receiving element PD1, a diode D1, an operational amplifier AMP1 and two output transistors TR1 and TR11, a photometry circuit II comprising a reference voltage source Eg2, a light receiving element PD2, a diode D3, an operational amplifier AMP2 and two output transistors TR2 and TR12, a photometry circuit III comprising a reference voltage source Eg3, a light receiving element PD3, a diode D5, an operational amplifier AMP3 and two output transistors TR3 and TR13, a photometry circuit IV comprising a reference voltage source Eg4, a light receiving element PD4, a diode D7, an operational amplifier AMP4 and two output transistors TR4 and TR14, and a photometry circuit V comprising a reference voltage source Eg5, a light receiving element PD5, a diode D9, an operational amplifier AMP5 and two output transistors TR5 and TR15. These photometry circuits each logarithmically compress and logarithmically expand electric currents photoelectrically converted by the light receiving element PD and provide two photometric outputs by the two output transistors TR, and the operation thereof is known and therefore need not be described herein.

The integration capacitor C1 is connected to one output of the five photometry circuits, and integrates the sum of the outputs of the photometry circuits.

The integration capacitors C10–C14 are connected to other outputs of the photometry circuits I–V, and integrate the outputs of the photometry circuits I–V.

When the charging voltage of the integration capacitor C1 reaches a voltage E corresponding to a predetermined proper quantity of light, a comparator COM sets it output to "L" and outputs a light emission stopping signal to STOP terminal.

Figure 15:
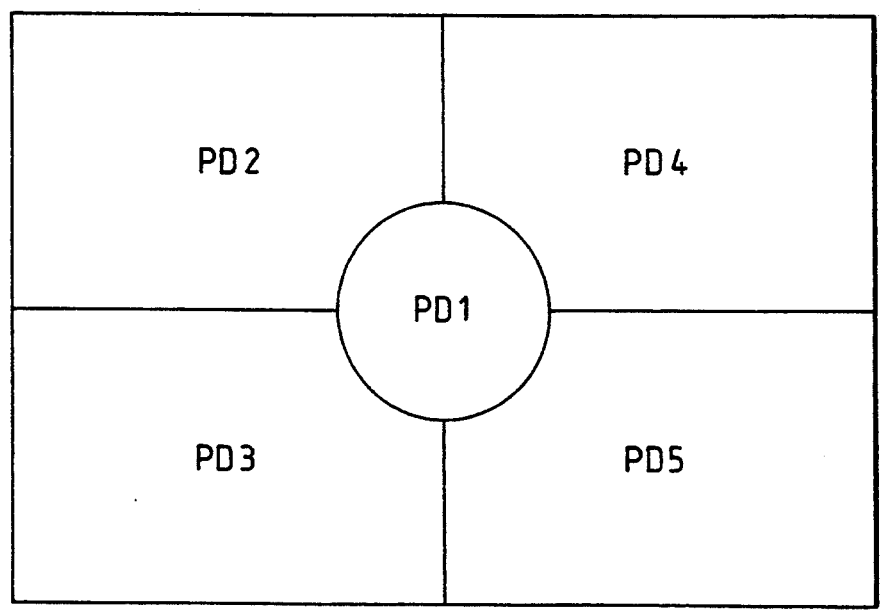
FIG. 15 shows the photometry range of a light receiving element in each stroboscopic photometry circuit provided in this camera.

The light receiving elements PD1, PD2, PD3, PD4 and PD5 are arranged so as to divisionally meter the range of the photographing picture plane shown in FIG. 15, and PD1 meters the central portion of the photographing picture plane, PD2 meters the left upper portion of the photographing picture plane, PD3 meters the left lower portion of the photographing picture plane, PD4 meters the right upper portion of the photographing picture plane, and PD5 meters the right lower portion of the photographing picture plane.

Figure 16:
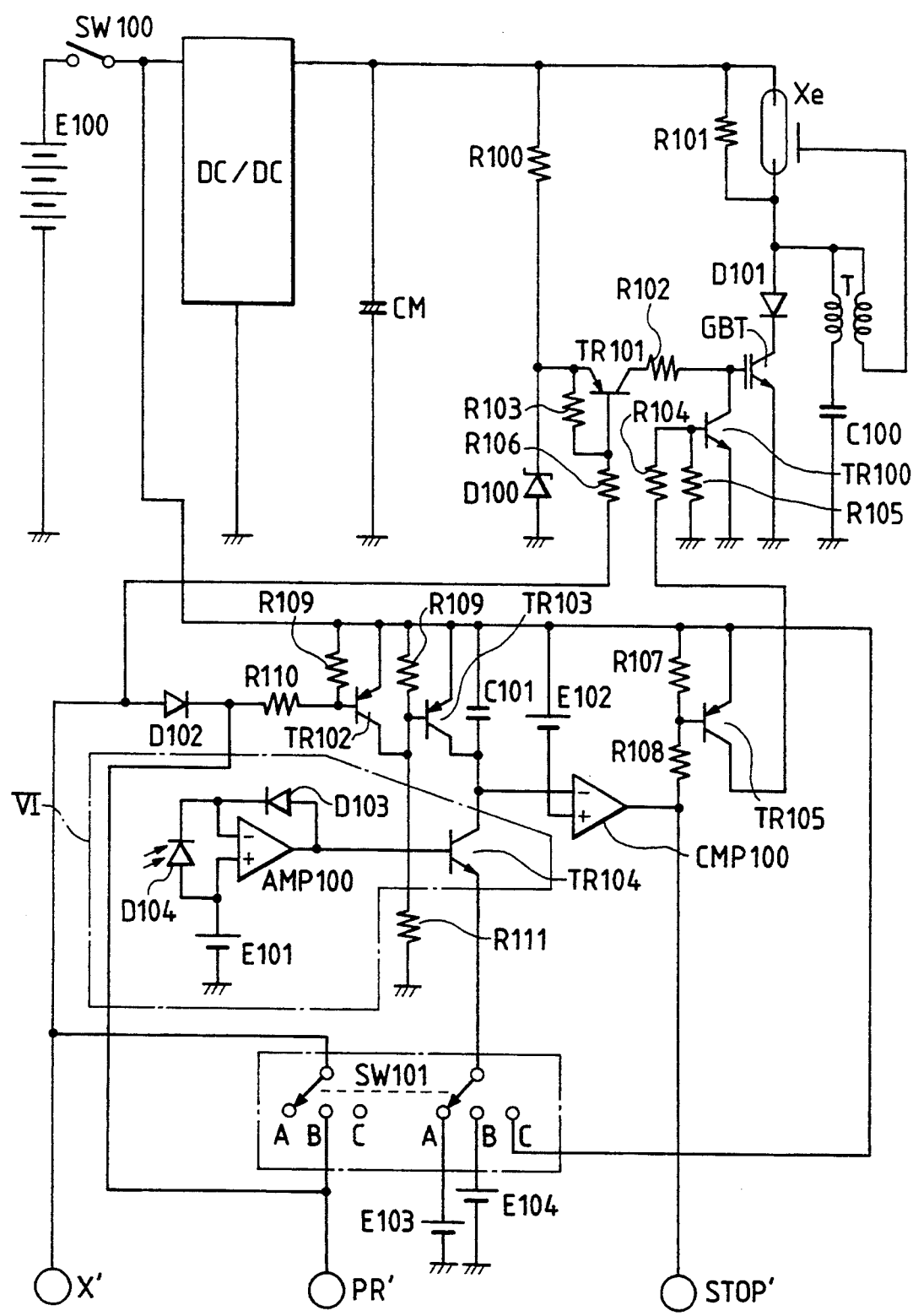
FIG. 16 is a block circuit diagram showing a stroboscopic device separably connected to this camera.
Figure 18A:
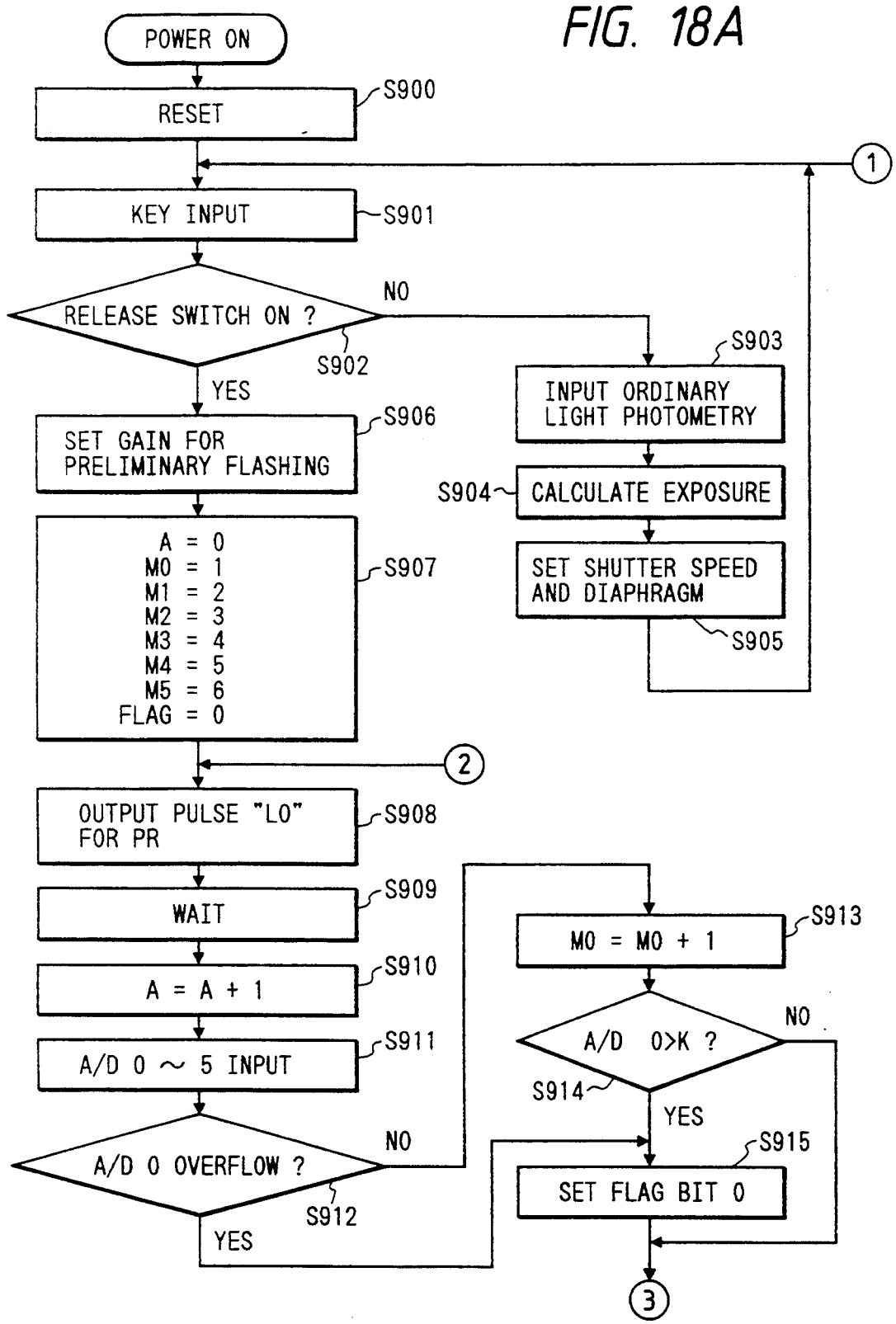
FIGS. 18A, 18B, 18C and 18D are flow charts showing the operation of a CPU in this camera.
Figure 18B:
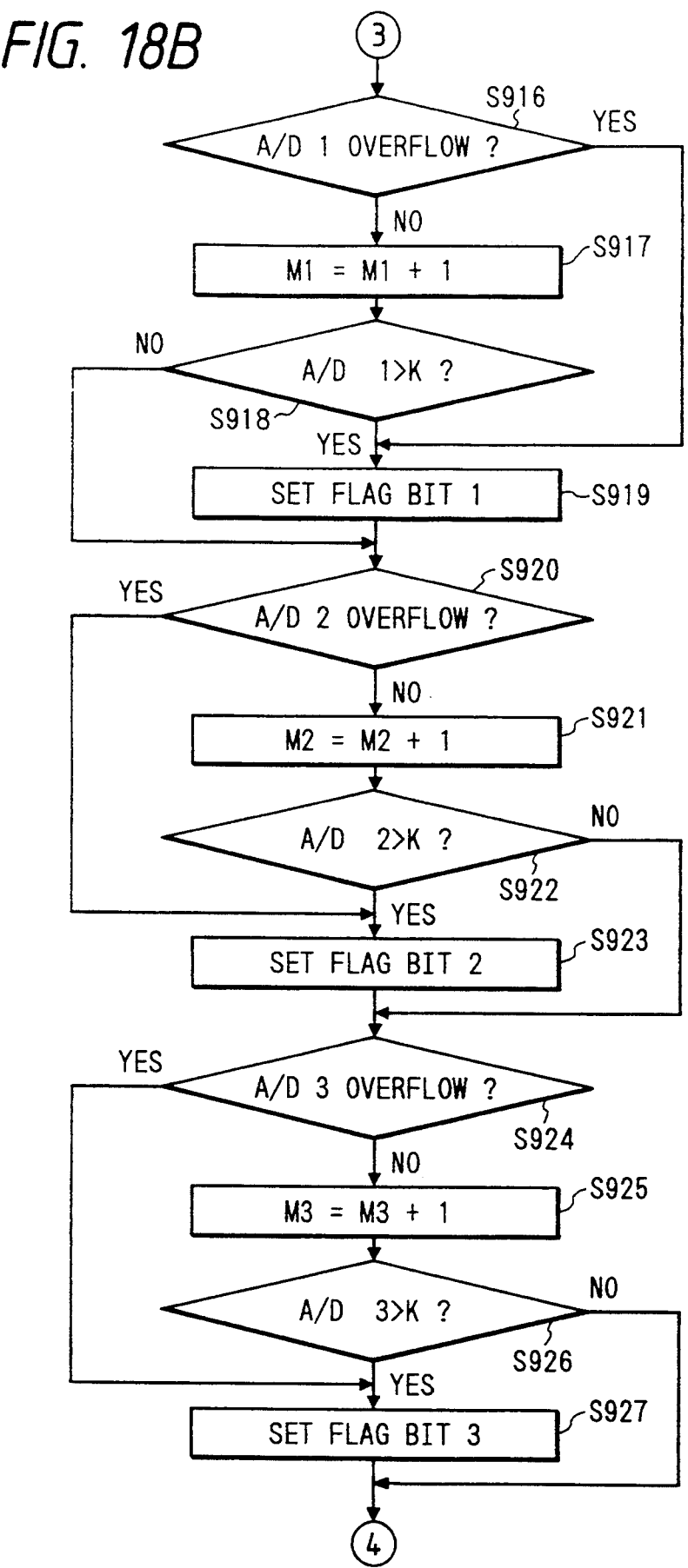
Figure 18C:
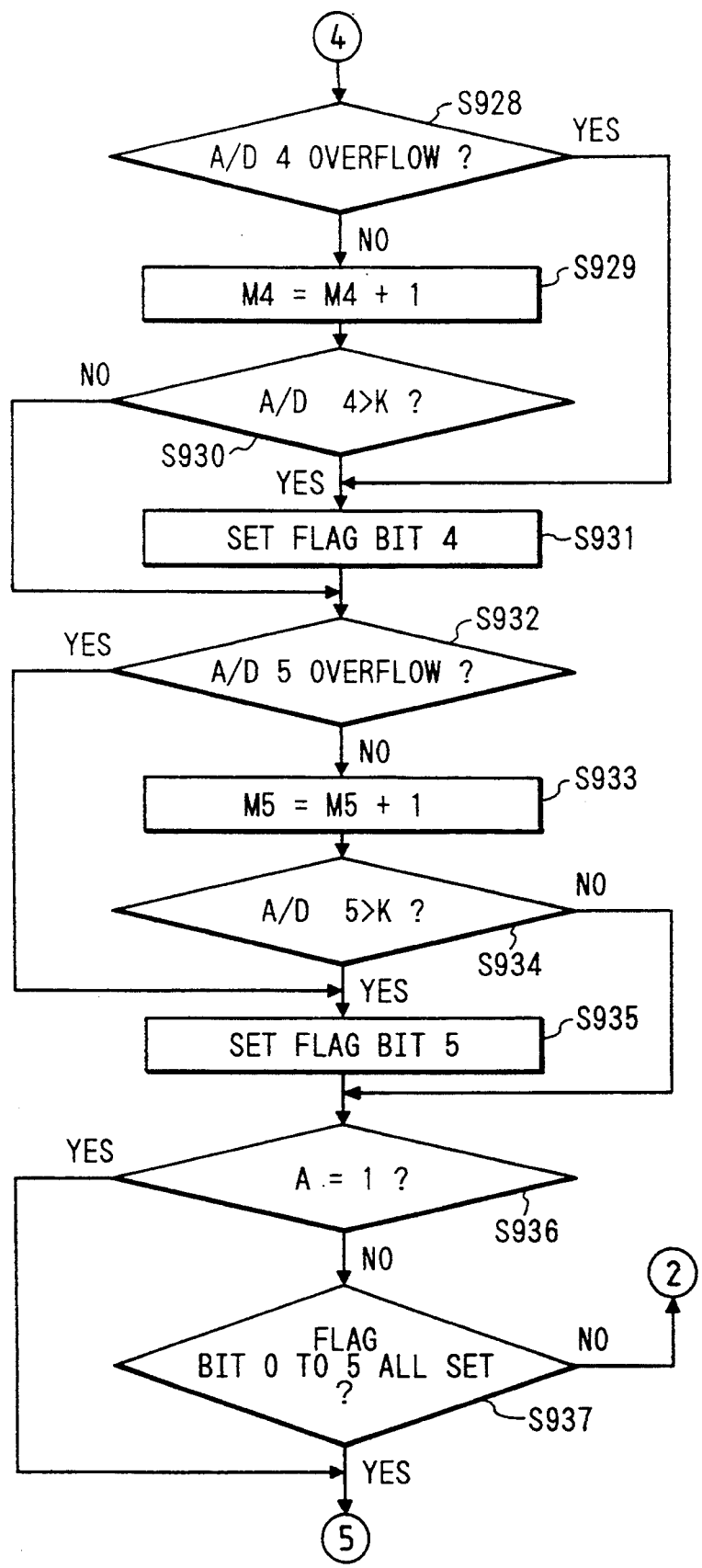
Figure 18D:
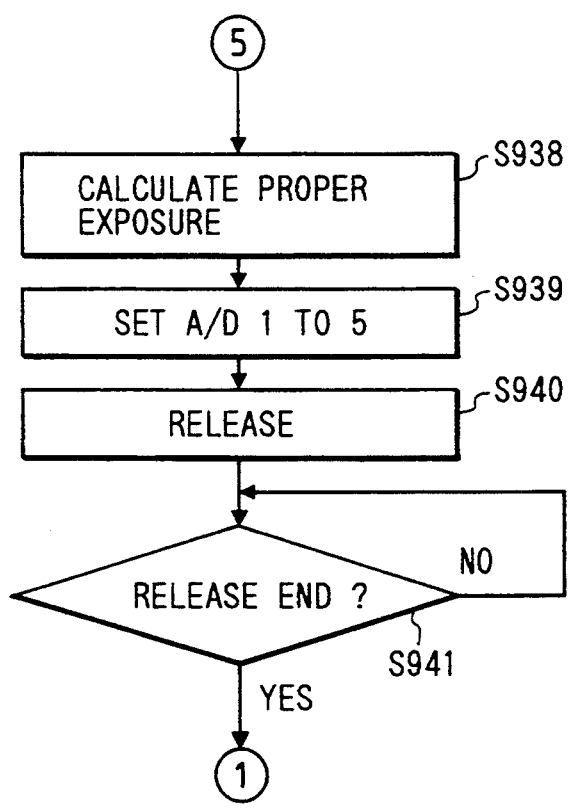

FIG. 16 shows the flashing device. The X', PR'0 and STOP' terminals of the flashing device are connected to the X terminal, PR terminal and STOP terminal, respectively, of the camera. SW100 designates a power source switch, and by the closing of this switch SW100, power from a source E100 is supplied to the circuit.

A booster circuit DC/DC boosts the power source voltage and charges a main capacitor CM and also charges a trigger capacitor C100 through a resistor R101 and the primary winding of a trigger transformer T. A Zener diode D100 and a transistor TR101 are also connected to the output of the booster circuit DC/DC through a resistor R100, and the Zener voltage of the Zener diode D100 is applied to the emitter of the transistor TR101.

The base of an insulation gate type bipolar transistor IGBT is connected to the collector of the transistor TR101 through a resistor R102, and the bipolar transistor IGBT is turned on by the turn-on of the transistor TR101.

The collector of a transistor TR100 whose emitter is grounded is also connected to the base of the bipolar transistor IGBT, and the bipolar transistor IGBT is turned off by the turn-on of the transistor TR100. The collector of the bipolar transistor IGBT is connected to a xenon tube Xe and the primary winding of the trigger transformer T through a diode D101. The emitter of the bipolar transistor IGBT is grounded and therefore, when the bipolar transistor IGBT is turned on, there is formed a closed loop between the main capacitor CM and the xenon tube X3. Also, a trigger capacitor C100 is rapidly caused to discharge through the primary winding of the trigger transformer.

The trigger transformer T produces a high voltage in the secondary winding thereof by the rapid discharging of the trigger capacitor C100, and applies trigger to the xenon tube Xe.

A circuit VI comprising a reference voltage source E101, a light receiving element D104, a diode D103, an operational amplifier AMP100 and an output transistor TR104 is a conventional photometry circuit. The light receiving element D104 is disposed so as to directly meter the light emitted by the xenon tube Xe, and converts the quantity of emitted light from the xenon tube Xe into a current value. The amplification factor at which the photometry circuit VI amplifies this electric current is determined by the reference voltage source E101 and the emitter potential of the transistor TR104, and the emitter potential of the transistor TR104 is selected by a mode switch SW101.

The mode switch SW101 is the flashing mode selection switch of the flashing device, and it is a circuit switch in which position A is the TTL mode, position B is the manual flash limiting flashing mode and position C is the manual full flashing mode. In the position A, the voltage of the voltage source E103 is applied to the emitter of the transistor TR104 to thereby set the quantity of emitted light during preliminary flashing. In the position B, the voltage of the voltage source E104 is applied to the emitter of the transistor TR104 to thereby set the quantity of emitted light during manual flashing (for example, ¼ of the quantity of light during full flashing). In the position C, the voltage of the voltage source E100 is applied to the emitter of the transistor TR104 to thereby prevent the photometry circuit VI from putting out an output, and set the quantity of emitted light so that full flashing may take place. Further, in the positions B and C, the X terminal and the PR terminal are short-circuited.

An integration capacitor C101 is connected to the output of the photometry circuit VI and integrates the result of photometry. A transistor TR103 is parallel-connected to the integration capacitor C101, and discharges the charges stored in the integration capacitor C101. A transistor TR102 is connected between the base and emitter of the transistor TR103, and when the transistor TR102 is turned on, the transistor TR103 is turned off to permit the charging of the integration capacitor C101.

The inverting input terminal of a comparator CMP100 is also connected to the integration capacitor C101, and when the charging voltage of the integration capacitor C101 reaches a voltage predetermined by the voltage source E102, the comparator CMP100 set its output to "L" and turns on a transistor TR105, thereby turning on a transistor TR100 connected to the transistor TR105.

The transistor TR100 is a transistor for turning off the bipolar transistor IGBT, and short-circuits the gate and emitter of the bipolar transistor IGBT to thereby turn off the bipolar transistor IGBT when the transistor TR100 is turned on.

PR' terminal is a terminal for receiving a preliminary flashing start signal, and when the PR' terminal becomes "L", the base current of the transistor 102 flows to the PR' terminal through a resistor R110, and the transistor 102 is turned on. Further, the base current of the transistor TR101 also flows to the PR' terminal through a resistor R106 and a diode D102, and the transistor TR101 is turned on.

X' terminal is a terminal for receiving a flashing start signal, and when the X' terminal becomes "L", the base current of the transistor TR101 flows to the X' terminal through a resistor R106, and the transistor TR101 is turned on. If at this time, the mode switch SW101 is in the position B, the base current of the transistor TR102 also flows to the PR' terminal through a resistor R110, and the transistor TR102 is also turned on.

STOP' terminal is a terminal for receiving a flashing stop signal and is connected to the output of the comparator CMP100. When the STOP' terminal becomes "L", the base current of the transistor TR105 flows to the STOP' terminal through a resistor R108, and the transistor TR105 is turned on.

FIG. 17 shows the waveforms of various portions when preliminary flashing is effected with the flashing device shown in FIG. 16 being connected to the camera shown in FIG. 14. FIG. 17(a) shows the waveform of the PR terminal (PR' terminal), i.e., the preliminary flashing start signal, and the xenon tube X3 starts preliminary flashing at points of time $t_1$, $t_3$, $t_5$ and $t_7$ whereat the PR' terminal become "L".

FIG. 17(b) represents the waveform of the emitted light of the xenon tube Xe, and the light emission is stopped at points of time $t_2$, $t_4$, $t_6$ and $t_8$.

FIG. 17(c) represents variations in the charging voltages of the integration capacitors C10, C11, C12, C13 and C14, i.e., variations in the voltages at points b, c, d, e and f shown in FIG. 14.

FIG. 17(d) represents a variation in the charging voltage of the integration capacitor C1, i.e., a variation in the voltage at a point "a" shown in FIG. 14.

The operation of the camera will now be described.

The CPU of the camera reads the current set state of the camera from the input device KEY. The CPU first reads the photometry mode of the camera, and outputs a photometry mode conforming to the photometry mode to the ordinary light photometry circuit AE. Photometry modes include, for example, the conventional multiphotometry in which a proper exposure amount is found by the use of a plurality of light receiving elements, spot photometry, central portion priority photometry, etc., and a photometry mode selected from among these by the setting dial, not shown, of the camera is output to the ordinary light photometry circuit AE. The ordinary light photometry circuit AE meters the ordinary light component in the photographing picture plane according to the mode output by the CPU, and transmits the result of the photometry to the CPU. Further, the ordinary light photometry circuit AE calculates a shutter speed from the result of the photometry, and sends the calculated shutter speed to the camera controller CONT.

The CPU displays the result of the photometry transmitted from the ordinary light photometry circuit AE on a display device, not shown, and informs the photographer of photographing information. If at this time, the photographing mode of the camera is the flash photographing mode, the CPU makes preparations for preliminary flashing. Usually, preliminary flashing is effected in such a manner that the quantity of preliminary flashlight is sufficiently small relative to the quantity of main flashlight so as not to affect main flashing. Therefore, the quantity of the reflected light from the object by preliminary flashing is small and in order to meter this, the amplification factors of the photometry circuits I–V must be increased in advance. So, the CPU outputs numerical values by which amplification factors great enough to meter the preliminary flashing are obtained to the converters D/A1–D/A5 which determine the amplification factors of the photometry circuits I–V. In this state, the CPU waits for a release signal from the input device KEY. When the camera is released, the input device KEY reads it and sends the release signal to the CPU. Thereby, the CPU starts the release operation.

At the release operation, the CPU first sends a reset signal to the digital-analog converters A/D0–A/D5. Thereby, the converters A/D0 and A/D1–A/D5 cause the integration capacitors C1 and C10–C14 to discharge. At this time, the transistor TR6 parallel-connected to the integration capacitor C1 is in its "OFF" state. After having caused the capacitors C1 and C10–C14 to discharge, the CPU set the PR terminal to "L" and commands the flashing device to effect preliminary flashing. When the flashing device thus effects preliminary flashing, the CPU returns the PR terminal to "H", and reads the integrated voltages of the integration capacitors C1 and C10–C14 through the analog-digital converters A/D0–A/D5. The resolving power of the analog-digital converters A/D is not infinite, but usually is 8 bits. In such case, values can be resolved to 1/256 relative to a maximum value. For example, if the maximum value is 1.024 V, conversion can be done only at 4 mV unit and therefore, when the converted numerical values are small, the error is great, and if the maximum value exceeds 1.024 V, overflow will take place and measurement will become impossible. Therefore, whether the outputs of the converters A/D0–A/D5 are suffering from overflow or whether the outputs of the converters A/D0–A/D5 have become such a great value that the error can be neglected (hereinafter this value will be called k) is checked. If all the outputs are a small value, the PR terminal is changed from "L" to "H" and the flashing device is caused to effect preliminary flashing, and this is repeated until all the outputs become equal to or greater than the value k for which error can be neglected. If in this course, there is any output which has overflowed while the other outputs are still a small value, the frequency of preliminary flashing effected until then is recorded and preliminary flashing is repeated until the other output assumes the value k.

When preliminary flashing is terminated, the CPU reads the outputs of the converters A/D0–A/D5 and measures the distribution of the reflectivity in the picture plane. At this time, with regard to those of the converters whose outputs have overflowed, the total quantity of received light during preliminary flashing is calculated from the number of times of preliminary flashing until those converters have overflowed, and with regard to those of the covnerters which have not overflowed, said total quantity of received light is calculated from the number of times of preliminary flashing effected. From the result of this, the average quantity of reflected light can be seen from the converter A/D0, the quantity of reflected light in the central portion of the picture plane can be seen from the converter A/D1, the quantity of reflected light in the left upper portion of the picture plane can be seen from the converter A/D2, the quantity of reflected light in the left lower portion of the picture plane can be seen from the converter A/D3, the quantity of reflected light in the right upper portion of the picture plane can be seen from the converter A/D4, and the quantity of reflected light in the right lower portion of the picture plane can be seen from the converter A/D5, and any abnormal reflecting portion can be found out from these quantities of reflected light. For example, an object which is abnormally great in quantity of reflected light as compared with the average quantity of reflected light is either an object of high reflectivity such as a mirror or an object whose distance to that portion is extremely short. Conversely, an object which is abnormally small in quantity of reflected light as compared with the average quantity of reflected light is either an object of low reflectivity such as a black wall or an object whose distance to that portion is extremely long. When such an object of abnormal reflectivity is found out, the CPU does not use the data of that portion, but calculates a proper compensation amount from the data of the remaining portion, and further meters main flashing by the other of the photometry circuits I–V than the photometry circuits for the abnormal reflecting portions.

When preliminary flashing is terminated, the CPU selects from the result one of the photometry circuits I–V which is to be used, and gives the amplification factor for the present invention to that selected photometry circuit. A method of non-selection of the photometry circuits is such that if the output of a digital-analog converter D/A are used as the source voltage, the output transistor of the photometry circuit corresponding to that D/A converter is turned off and provides out no output and the amplification factor of that photometry circuit becomes zero. After having set the amplification factors of the photometry circuits I–V, the CPU instructs the camera controller CONT to release, and further informs it that the current mode is the flash photographing mode.

Thereby, the camera controller CONT moves up the mirror and turns on the transistor TR6 to thereby cause the integration capacitor C1 to discharge. Thereafter, the preceding shutter blind is opened and when the preceding shutter blind is fully opened, the camera controller CONT sets the x terminal to "L" and causes the flashing device to effect main flashing and also turns off the transistor TR6 and starts the charging of the integration capacitor C1. Since the current mode is the flash photographing mode, the camera controller CONT renders the shutter speed equal to or lower than the synchro speed, and closes the succeeding shutter blind at that shutter speed.

When the flash device starts main flashing, the reflected light thereof is metered by the photometry circuit selected by the CPU and the integration capacitor C1 is charged. When the charging voltage of the integration capacitor C1 reaches the source voltage E and a proper quantity of light is reached, the comparator COM outputs a flashing stop signal through the STOP terminal, thereby stopping the flashing of the flashing device.

FIGS. 17(c) and (d) show the changes of the charging voltages of the integration capacitors C1 and C10–C14 in the camera during preliminary flashing. At a point of time $t_1$, the flashing device starts preliminary flashing, and at a point of time $t_2$, a predetermined quantity of light is reached and preliminary flashing is stopped. The integration capacitors C1, C10, C11, C12, C13 and C14 integrate the outputs of the photometry circuits I–V and the voltages at points a and b–f drop. At the point of time $t_2$ to a point of time $t_3$, there is no variation in the integrated voltage. At the point of time $t_3$, preliminary flashing is again effected and the voltage drops further. This is repeated, and preliminary flashing is stopped at a point of time $t_8$. This waveform is an example in which an object of high reflectivity exists in the right lower portion of the picture plane, and only the integration capacitor C14 integrates more than the others and the voltage at the point f is lower than the voltages at the other points. From this result, the CPU renders only the photometry circuit V for the right lower portion of the picture plane non-selective and uses the remaining four photometry circuits I–IV to effect photometry for main flashing.

FIGS. 18A—18D are flow charts showing the operation of the CPU in the camera shown in FIG. 14. The operation of the CPU will be described in greater detail with reference to these flow charts.

When the power source switch of the camera is closed, the CPU and other components are reset (a step S900), and the camera starts its operation. First, at a step S901, the CPU reads the state of the switch of the camera from the input device KEY and sets various modes. Next, at a stp S902, whether the release button is ON is confirmed, and if it is not ON, at a step S903, the photometric value of ordinary light is read from the ordinary light photometry circuit AE, and at a step S904, the shutter speed and aperture are calculated from the read photometric value and the photometry mode of the camera read by the input device KEY, and at a step S905, the shutter 10 and aperture are sent to the camera controller CONT, and return is made to the step S901. In this state, the CPU waits for the camera to be released, and when the camera is released, at the step S902, the CPU judges it, and advance is made to a step S906. At the step S906, the converters D/A1–D/A5 are set so that all the outputs of the photometry circuits I–V may become equal to one another when an object having a uniform reflectivity is illuminated by the flashing device, and the gain for preliminary flashing is set. Subsequently, at a step S907, a memory (A) for recording the number of times of preliminary flashing, memories (M0–M5) for recording the number of times of preliminary flashing until the outputs of the converters A/D1–A/D5 overflow, and a memory (flag) showing the output states of the converters A/D1–A/D5 are reset. Then, at a step S908, "L0" pulse is output to the PR terminal and preliminary flashing is effected once. At a step S909, the termination of flashing is waited for, and at a step S910, the number of times of preliminary flashing is recorded. At a step S911, the otuputs of the converters A/D1–A/D5 are read. Then, the output of the converter A/D0 which is the sum total of the outputs of the photometry circuits I–V is first examined. At a step S912, whether the converter A/D0 has overflowed is checked, and if it has not overflowed, advance is made to a step S913, where 1 is added to the memory M0, and advance is made to a step S914, where whether the output of the converter A/D0 is equal to or greater than the sufficiently great value k is checked up. If the output of the converter A/D0 is not equal to or greater than k, skip is made to a step S916, where the output of the next converter A/D1 is checked. If the output of the converter A/D0 has overflowed (if the step S912 is Y) or if the output of the converter A/D0 is equal to or greater than k (if the step S914 is Y), advance is made to a step S915, where the position bit 0 of the memory (flag) showing the state of the converter A/D0 is set, and advance is made to a step S916. Thereafter, in the same manner, the converter A/D1 is checked at steps S916–S919, the converter A/D2 is checked at steps S920–S923, the converter A/D3 is checked at steps S924–S927, the converter A/D4 is checked at steps S928–S931, and the converter A/D5 is checked at step S932–S935, and the result thereof recorded in a memory. When the outputs of the converters A/D0–A/D5 are all checked, advance is made to a step S936, where whether the preliminary flashing control unit, a calculation unit number of times of preliminary flashing has reached a prescribed value l is checked, and if it has reached the prescribed value l, preliminary flashing is terminated, and advance is made to a step S938. Thus, when flash photographing is impossible, it does not happen that preliminary flashing is repeated endlessly, and waste of energy is prevented. If the number of times of preliminary flashing has not reached the prescribed value l, advance is made to a step S937, where the memory (flag) is checked up, and whether the outputs of the converters A/D0–A/D5 include overflow and are all equal to or greater than k, that is, whether bit 0–5 are all set, is examined. If the outputs are all equal to or greater than k, preliminary flashing is terminated as in the case where the number of times of preliminary flashing has reached the prescribed value l; and advance is made to a step S938. If the outputs are all not equal to or greater than k, return is made to the step S908, where preliminary flashing and the checking of the outputs of the converters A/D0-A/D5 are repeated. When preliminary flashing is terminated in this manner, at the step S938, the gains of the photometry circuits I-V which provide proper exposure are calculated from the outputs of the converters A/D0-A/D5, and at a step S939, the results of the calculation are set in the converters D/A1-D/A5, and are output to the photometry circuits I-V. Thus, the photometry circuits I-V obtain proper gains for controlling main flashing. At a step S940, the camera enters the release operation, and when the flash device starts to illuminate the object, main flashing can be stopped at an optimum quantity of light. Thereafter, at a step S941, the termination of the release operation is waited for, and when the release operation is terminated, return is made to the step S901.

The proper exposure calculating method at the step S938 will hereinafter be described.

As set at the step S906, the gains of the photometry circuits I-V are set so that the outputs of the photometry circuits I-V may all be the same when an object having a uniform reflectivity is illuminated by the flashing device, and therefore, the output of the converter A/D0; is the output when the entire picture plane has been averagely metered. In contrast, the outputs of the converters A/D1-A/D5 are the outputs of partial photometry by the light receiving elements PD1-PD5. The output of the converter A/D0 is the sum total of the outputs of the five photometry circuits, and therefore, if the capacities of the integration capacitors C10-C14 are made into 1/5 of the capacity of the integration capacitor C1, the voltage integrated by the same electric current becomes five times as great as the capacity of the integration capacitor C1. Thus, in the case of an object having a uniform reflectivity, the outputs of the converters A/D0-A/D5 all become the same. When the capacities of the integration capacitors C1 and C10-C14 are in such a state, it can be said that the reflectivity of the object is substantially uniform when the outputs of the converters A/D1-A/D5 are substantially equal to the output of the converter A/D0, and it can be judged that a proper quantity of light can be obtained by average photometry. If some of the converters A/D0-A/D5 overflow when preliminary flashing is being repeated, the number of times of flashing until those converters overflow is recorded in the memories M0=M5. Also, as previously described, the quantity of emitted light during one time of preliminary flashing is constant and therefore, the total quantity of received light during preliminary flashing can be estimated from the number of times of flashing until the converters overflow. Assuming, for example, that preliminary flashing is effected eight times and the converter A/D1 overflows at the fourth preliminary flahsing and the converter A/D2 becomes one half of its dynamic range at the eighth preliminary flashing, the converter A/D2 overflows by sixteen times of preliminary flashing. That is, the converter A/D1 can be estimated to have an output about four times as great as the output of the converter A/D2. Also, when even one of the converters A/D0-A/D5 cannot obtain an output equal to or greater than k even if preliminary flashing is repeated by the prescribed value l, it can be judged that the output of that portion is very small. From the thus obtained outputs during preliminary flashing (the actual output and the estimated output), the output of the converter A/D0 (the average quantity of reflected light in the entire picture plane) is first compared with the outputs of the converters A/D1-A/D5 (the quantities of reflected light in the respective portions of the picture plane), and whether there is any picture plane portion in which the difference is great is looked for. If there is a picture plane portion in which the difference is great, it can be judged that there is an object of abnormal reflectivity in that picture plane portion or that in that picture plane portion, there is an object whose distance is shorter or longer than the others. If the difference in that picture plane portion is extremely great, the gains of the photometry circuits I-V are set so that that picture plane portion may not affect photometry. For example, the gain of the photometry circuit corresponding to that picture plane portion is made extremely small and the gains of the photometry circuits corresponding to the other picture plane portions may be made correspondingly great. If the difference in a picture plane portion is great but not excessive the setting of gains is done so that the rates at which the output of the photometry circuits I-V corresponding to the respective picture plane portions contribute to the photometry of the whole may be equal to one another. For example, if there is a picture plane portion in which the output is twice as great as that in the other picture plane portions, gains are set so that the gain of that picture plane portion may be one half of that of the other picture plane portions and the outputs of the photometry circuits I-V may assume the same value. As described above, if there is not a great difference between the outputs of the photometry circuits I-V, average photometry is effected. If there is a difference between said outputs, the outputs of the photometry circuits are made uniform, thereby reducing the influence of the abnormal portion, and if there is an extreme difference between said outputs, gains for obtaining proper exposure are set in such a manner that that picture plane portion is not metered.

The operation of the flashing device will now be described.

In FIG. 16, when the power source switch SW100 is closed, electric power is supplied to each circuit.

The booster circuit DC/DC boosts the source voltage to charge the main capacitor CM and the trigger capacitor C100, and supplies the Zener voltage of D100 to the emitter of the transistor TR101. In the normal state, the PR' terminal is at "H" and therefore, the transistor TR102 is OFF. Thus, the transistor TR103 is turned on to cause the integration capacitor C101 to discharge.

When the camera sets the PR' terminal to "L", the base current of the transistor TR102 flows to the PR' terminal through the resistor R110, and the transistor TR102 is turned on. When the transistor TR102 is turned on, the base-emitter of the transistor TR103 is short-circuited, and the transistor TR103 is turned off and the integration capacitor C101 starts integration. Simultaneously therewith, the base current of the transistor TR101 flows to the PR' terminal through the diode D102 and the resistor R106, and the transistor TR101 is turned on. By the transistor TR101 being thus turned on, the gate voltage of the Zener diode D100 is supplied to the gate of the bipolar transistor IGBT through the resistor R102, and the bipolar transistor IGBT is turned on.

When the bipolar transistor IGBT is turned on, charges stored in the capacitor C100 are discharged through the primary winding of the trigger transformer T and the diode D101 to thereby produce a high voltage in the secondary winding of the trigger transformer T.

Thereby, xenon gas in the xenon tube Xe is excited and the impedance of the xenon tube Xe is reduced and thus, the discharging loop of the main capacitor CM is formed and the xenon tube starts its flashing.

When the xenon tube Xe starts its flashing, the photometry circuit VI meters the amount of emitted light from the xenon tube Xe at an amplification factor determined by the reference voltage sources E101 and E103, and the result of the photometry is charged into the integration capacitor C101. When the charging voltage of this integration capacitor C101 reaches a voltage determined by the reference voltage source E102, the comparator CMP100 outputs "L" to thereby turn on the transistor TR105. By the transistor TR105 being thus turned on, the transistor TR100 is turned on, and the gate-emitter of the bipolar transistor IGBT is short-circuited, whereby the bipolar transistor IGBT is turned off and the xenon tube Xe stops its flashing.

At this time, the light receiving element D104 is installed so as to directly look at the xenon tube Xe and consequently, the xenon tube Xe flashes always at a predetermined quantity of light, and the quantity of emitted light thereof is determined by the reference voltage sources E101 and E103.

Thereafter, the PR' terminal assumes "H" and when it assumes "L" again, the xenon tube Xe repeats flashing in the same manner as described above.

When preliminary flashing is terminated and subsequently the X' terminal assumes "L", the base current of the transistor TR101 flows to the X' terminal through the resistor R106, and the transistor TR101 is turned on and the xenon tube Xe starts its flashing. At this time, however, the transistor TR102 is OFF and therefore, the integration capacitor C101 which is the output of the photometry circuit VI is not charged and the comparator CMP100 does not output "L". Therefore, the flashing of the xenon tube Xe at a predetermiend quantity of light is not stopped. When during the flashing of the xenon tube Xe, the STOP' terminal assumes "L", the transistor TR105 is turned on and the flashing of the xenon tube Xe is stopped.

When the mode switch SW101 is in the position B, the flashing device is in the manual flash limiting flashing mode, and when the X' terminal assumes "L", the transistors TR101 and TR102 are turned on and the xenon tube Xe flashes at a predetermined quantity of light determined by the reference voltage sources E101 and E104.

When the mode switch SW101 is in the position C, the flashing device is in the manual full flashing mode, and when the X' terminal assumes "L", the transistor TR101 is turned on and the transistor TR102 maintains its OFF state, and the photometry circuit VI does not operate and thus, full flashing is executed.

In the above-described embodiment, the quantity of light per one time of preliminary flashing is constant. However if the total quantity of emitted light is known, the preliminary flashing need not always be a constant quantity of light. Rather the quantity of light per one time of preliminary flashing may be varied so as to become a quantity of light for which exposure calculation can be readily effected. For example, this may be done in such a manner that the guide number of the first preliminary flashing is 1, the guide number of the second preliminary flashing is 1, the guide number of the third preliminary flashing is 1.4 and the guide number of the fourth preliminary flashing is 2 and that if the number of times of preliminary flashing is 1, the total quantity of emitted light is the guide number 1, and if the number of times of preliminary flashing is 2, the total quantity of emitted light is the guide number 1.4, and if the number of times of preliminary flashing is 3, the total quantity of emitted light is the guide number 2, and if the number of times of preliminary flashing is 4, the total quantity of emitted light is the guide number 2.8.

The above embodiment has been described with respect to a camera to which the flashing device is separably connected, but the present invention can likewise be applied even to a camera containing a flashing device therein. Also, the application of the present invention to a flashing device will be possible if the photometry circuits I-V and the CPU are carried therein. Further, if the present invention is applied to a camera system having an auto focus device, the quantity of reflected light can be accurately measured irrespective of the reflectivity and distance of an object and the then total quantity of emitted light can be known from the number of times of flashing and therefore, the reflectivity of the object can be accurately measured from the relation between the distance and the quantity of emitted light.

In the present embodiment, design is made such that the flash limiting level is varied, but an entirely similar effect will be obtained even if the flash limiting level is made constant and the gain of the integrated value is changed. Accordingly, the expression that the flash limiting level is varied also covers, in the present invention, a method of changing the gains of the integrated value and the amplifier. Also, in the foregoing, description has been made of a camera using silver salt film, but the present invention is equally applicable, for example, to an electronic still camera using a floppy disk to effect photographing.

We claim:

1. In a camera on which is mountable a flashing device for effecting main flashing during flash photographing and preliminary flashing prior to said main flashing, automatic flash limiting apparatus comprising:
    split photometry means for metering reflected light from an object field divided into a plurality of areas and outputting a photometric output for each of these areas;
    preliminary flashing control means for causing said flashing device to effect plural times of preliminary flashing each at a known quantity of emitted light, and at each time, receiving as an input the photometric outputs from said split photometry means, and when at least one of said photometric outputs reaches a predetermined value, causing said preliminary flashing to be repeated while varying said quantity of emitted light, and stopping said preliminary flashing when the number of said photometric outputs reaching said predetermined value becomes null; and
    main flashing control means for effecting flash limiting control during said main flashing on the basis of the quantity of light during a last stage of preliminary flashing controlled by said preliminary flashing control means, and said photometric outputs from said split photometry means at said last stage.

2. The automatic flash limiting apparatus of the camera of claim 1, wherein said predetermined value of said preliminary flashing control means is a flash limiting level during said preliminary flashing.

3. The automatic flash limiting apparatus of the camera of claim 1, wherein said split photometry means has a plurality of divisional light receiving elements corresponding to said plurality of areas, and said predetermined value of said preliminary flashing control means is a saturation level of said divisional light receiving elements.

4. In a camera on which is mountable a flashing device for effecting main flashing during flash photographing and preliminary flashing prior to said main flashing, automatic flash limiting apparatus comprising
split photometry means for metering reflected light from an object field divided into a plurality of areas and outputting a photometric output for each of these areas;
preliminary flashing control means for causing said flashing device to effect plural times of preliminary each at a known quantity of emitted light; and
main flashing control means for effecting flash limiting control during said main flashing on the basis of a quantity of light during said preliminary flashing controlled by said preliminary flashing control means, and the photometric outputs from said split photometry means during preliminary flashing.

5. The automatic flash limiting apparatus of the camera of claim 4, wherein said preliminary flashing control means causes said flashing device to effect said preliminary flashing while varying said known quantity of emitted light.

6. The automatic flash limiting apparatus of the camera of claim 4, wherein said preliminary flashing control means causes said flashing device to effect said preliminary flashing plural times at a fixed quantity of emitted light.

7. The automatic flash limiting apparatus of the camera of claim 5, wherein said preliminary flashing control means causes said flashing device to effect said preliminary flashing while decreasing said known quantity of emitted light.

8. The automatic flash limiting apparatus of the camera of claim 5, wherein said preliminary flashing control means causes said flashing device to effect said preliminary flashing while increasing said known quantity of emitted light.

9. The automatic flash limiting apparatus of the camera of claim 4, wherein said main flashing control means determines areas among said areas which are not used for said flash limiting control during said main flashing.

10. The automatic flash limiting apparatus of the camera of claim 4, wherein said main flashing control means determines a respective contribution rate at which each of said photometric outputs from said areas during said main flashing contributes to flash limiting.

11. The automatic flash limiting apparatus of the camera of claim 4, wherein the quantity of light on which said main flashing control means bases said flash limiting control is a quantity of light at a last stage of preliminary flashing controlled by said preliminary flashing control means.

12. The automatic flash limiting apparatus of the camera of claim 4, wherein the quantity of light on which said main flashing control means bases said flash limiting control is the sum of the quantities of light in at least two times of preliminary flashing.

13. The automatic flash limiting appratus of the camera of claim 4, wherein the number of times of the preliminary flashing of said preliminary flashing control means is limited to a predetermined number of times.

14. The automatic flash limiting apparatus of the camera of claim 5, wherein said preliminary flashing control means causes said flashing device to effect said preliminary flashing while varying said known quantity of emitted light in the fashion of geometrical series.

15. In a camera on which is mountable a flashing device for effecting main flashing during flash photographing and preliminary flashing prior to said main flashing, automatic flash limiting apparatus comprising:
split photometry means for metering reflected light from an object field divided into a plurality of areas and outputting a photometric output for each of these areas;
preliminary flashing control means for causing said flashing device to effect plural times of preliminary flashing each at a known quantity of emitted light; and
main flashing control means for effecting flash limiting control during said main flashing on the basis of the number of times of said preliminary flashing controlled by said preliminary flashing control means, and said photometric outputs from said split photometry means during preliminary flashing.

16. In a camera on which is mountable a flashing device for effecting main flashing during flash photographing and preliminary flashing prior to said main flashing, automatic flash limiting apparatus comprising:
split photometry means for metering reflected light from an object field divided into a plurality of areas and outputting a photometric output for each of these areas;
preliminary flashing control means for causing said flashing device to effect plural times of preliminary flashing each at a known quantity of emitted light; and
main flashing control means for effecting flash limiting control during said main flashing on the basis of a quantity of light during said preliminary flashing controlled by said preliminary flashing control means, said photometric outputs from said split photometry means, and a flash limiting level calculated by the use of said photometric outputs from said split photometry means during preliminary flashing.

17. In a camera system having an automatic flashing control device which controls main flashing on the basis of results of preliminary flashing conducted plural times prior to said main flashing, each time at a known quantity of emitted light, a flashing device, comprising:
a flash emitting portion for effecting said main flashing during flash photographing and for effecting said preliminary flashing;
means for receiving commands from said automatic flashing control device;
flashing control means responsive to a preliminary flashing command received by said receiving means to cause said flash emitting portion to effect said preliminary flashing, and responsive to a later received main flashing command to cause said flash emitting portion to effect said main flashing.

18. The flashing device of claim 17, wherein said flashing control means effects said preliminary flashing while varying said known quantity of emitted light.

19. The flashing device of claim 17, wherein said flashing control means effects said preliminary flashing at a fixed quantity of emitted light plural times.

20. The flashing device of claim 17, wherein said flashing control means effects said preliminary flashing while decreasing said known quantity of emitted light.

21. The flashing device of claim 17, wherein said flashing control means effects said preliminary flashing while increasing said known quantity of emitted light.

22. The flashing device of claim 17, wherein the number of times of the preliminary flashing of said flashing control means is limited to a predetermined number of times.

23. The flashing device of claim 17, wherein said flashing control means effects said preliminary flashing while varying said known quantity of emitted light in the fashion of geometrical series.

24. The flashing device of claim 17, wherein the quantity of preliminary flashlight is smaller than the quantity of main flashlight.

25. A camera system comprising a flashing device for effecting main flashing during flash photographing and preliminary flashing prior to said main flashing, and a camera having an automatic flash limiting apparatus, said camera system including,
  split photometry means for metering reflected light from an object field divided into a plurality of areas and outputting a photometric output for each of these areas;
  preliminary flashing control means for causing said flashing device to effect plural times of preliminary flashing each at a known quantity of emitted light; and
  main flashing control means for effecting flash limiting control of the main flashing of said flashing device on a basis of the quantity of light during said preliminary flashing controlled by said preliminary flashing control means, and said photometric outputs from said split photometry means during preliminary flashing.

26. The camera system of claim 25, wherein said preliminary flashing control means causes said flashing device to effect said preliminary flashing while varying said known quantity of emitted light.

27. The camera system of claim 25, wherein said preliminary flashing control means causes said flashing device to effect said preliminary flashing at a fixed quantity of emitted light plural times.

28. The camera system of claim 25, wherein said preliminary flashing control means causes said flashing device to effect said preliminary flashing while decreasing said known quantity of emitted light.

29. The camera system of claim 25, wherein said preliminary flashing control means causes said flashing device to effect said preliminary flashing while increasing said known quantity of emitted light.

30. The camera system of claim 25, wherein said main flahsing control means determines areas among said plurality of areas which are not used for said flash limiting control during said main flashing.

31. The camera system of claim 25, wherein said main flashing control means determines a respective contribution rate at which each of said photometric outputs from said areas during said main flashing contributes to flash limiting.

32. The camera system of claim 24, wherein the quantity of light on which said main flashing control means bases said flash limiting control is a quantity of light at a last stage of preliminary flashing controlled by said preliminary flashing control means.

33. The camera system of claim 25, wherein the quantity of light on which said main flashing control means bases said flash limiting control is the sum of quantities of light in at least two times of preliminary flashing.

34. The camera system of claim 25, wherein the number of times of the preliminary flashing of said preliminary flashing control means is limited to a predetermined number.

35. The camera system of claim 25, wherein said preliminary flashing control means causes said flashing device to effect said preliminary flashing while varying said known quantity of emitted light in the fashion of geometrical series.

36. A camera system comprising a flashing device for effecting main flashing during flash photographing and preliminary flashing prior to said main flashing, and a camera having an automatic flash limiting apparatus, said camera system including:
  split photometry means for metering reflected light from an object field divided into a plurality of areas and outputting a photometric output for each of these areas;
  preliminary flashing control means for causing said flashing device to effect plural times of preliminary flashing each at a known quantity of emitted light; and
  main flashing control means for effecting flash limiting control of the main flashing of said flashing device on the basis of the number of times of said preliminary flashing controlled by said preliminary flashing control means, and said photometric outputs from said split photometry means during preliminary flashing.

37. A camera system comprising a flashing device for effecting main flashing during flash photographing and preliminary flashing prior to said main flashing, and a camera having an automatic flash limiting apparatus, said camera system including
  split photometry means for metering reflected light from an object field divided into a plurality of areas and outputting a photometric output for each of these areas;
  preliminary flashing control means for causing said flashing device to effect plural times of preliminary flashing each at a known quantity of emitted light; and
  main flashing control means for effecting flash limiting control of the main flashing of said flashing device on a basis of the quantity of light during said preliminary flashing controlled by said preliminary flashing control means, said photometric outputs from said split photometry means, and a flash limiting level calculated by the use of said photometric outputs from said split photometry means during preliminary flashing.

38. A camera system including a camera and a flashing device, comprising:
  a release switch provided on a body of the camera and operable externally of the camera body;
  a release circuit provided in the camera body for generating a release signal in response to an operation of said release switch;

a photometry circuit including a divisional photometry element which performs photometry of an object field with the object field being divided into a plurality of areas;

a flashing signal generating circuit which generates, in response to said release signal, a signal for causing said flashing device to effect plural times of preliminary flashing and a signal for causing said flashing device to effect a subsequent main flashing;

a flashing circuit responsive to the signals from said flashing signal generating circuit for effecting the preliminary flashing and the subsequent main flashing; and a flashing control circuit for controlling a quantity of emitted light of said flashing device;

wherein during said preliminary flashing of said flashing device, said photometry circuit measures light of the preliminary flashing reflected from the object field, and during said main flashing of said flashing device, said photometry circuit measures light of the main flashing reflected from the object field; and wherein said flashing control circuit controls the quantity of emitted light of the main flashing based on a result of photometry of said photometry circuit for the preliminary flashing.

39. A camera system according to claim 38, wherein said plural times of preliminary flashing are effected with the quantity of light being varied.

40. A camera system according to claim 38, wherein said plural times of preliminary flashing are effected at a constant quantity of light.

41. A camera system according to claim 38, wherein said plural times of preliminary flashing are effected with the quantity of light being decreased.

42. A camera system according to claim 38, wherein said plural times of preliminary flashing are effected with the quantity of light being increased.

43. A camera system according to claim 38, wherein said flashing control circuit determines an area among said plurality of areas which is not used for the control of the quantity of emitted light of the main flashing.

44. A camera system according to claim 38, wherein said flashing control circuit determines a contribution rate of each of said plurality of areas in controlling the quantity of emitted light of the main flashing.

45. A camera system according to claim 38, wherein number of the times of said preliminary flashing is limited to a predetermined number.

46. A camera system according to claim 38, wherein said plural times of preliminary flashing are effected with the quantity of light being varied in a fashion of geometrical series.

47. A camera system including a camera and a flashing device, comprising:

a release switch provided on the body of the camera and operable externally of the camera body;

a release circuit provided in the camera body for generating a release signal in response to an operation of said release switch;

a photometry circuit including a divisional photometry element which performs photometry of an object field with the object field being divided into a plurality of areas;

a flashing signal generating circuit which generates, in response to said release signal, a signal for causing said flashing device to effect plural times of preliminary flashing and a signal for causing said flashing device to effect a subsequent main flashing;

a flashing circuit responsive to the signals from said flashing signal generating circuit for effecting the preliminary flashing and the subsequent main flashing;

a flashing control circuit for controlling a quantity of emitted light of said flashing device; and a light shielding member movable between a position at which the shielding member shields a film surface and a position at which the shielding member does not shield the film surface;

wherein during the preliminary flashing of said flashing device, said photometry circuit measures light of the object field reflected by said light shielding member, and during the main flashing, said photometry circuit measures light of the object field reflected by the film surface; and wherein said flashing control circuit controls the quantity of emitted light of the main flashing based on a result of photometry of said photometry circuit for the preliminary flashing.

48. A camera system according to claim 47, wherein said light shielding member is a shutter blade.

49. A camera system according to claim 47, wherein said plural times of preliminary flashing are effected with the quantity of light being varied.

50. A camera system according to claim 47, wherein said plural times of preliminary flashing are effected at a constant quantity of light.

51. A camera system according to claim 47, wherein said plural times of preliminary flashing are effected with the quantity of light being decreased.

52. A camera system according to claim 47, wherein said plural times of preliminary flashing are effected with the quantity of light being increased.

53. A camera system according to claim 47, wherein said flashing control circuit determines an area among said plurality of areas which is not used for the control of the quantity of emitted light of the main flashing.

54. A camera system according to claim 47, wherein said flashing control circuit determines a contribution rate of each of said plurality of areas in controlling the quantity of emitted light of the main flashing.

55. A camera system according to claim 47, wherein number of the times of said preliminary flashing is limited to a predetermined number.

56. A camera system according to claim 47, wherein said plural times of preliminary flashing are effected with the quantity of light being varied in a fashion of geometrical series.

57. In a camera system including a camera and a flashing device, a method of performing flash photography, comprising the steps of:

causing said flashing device to effect plural times of preliminary flashing upon input of a signal for starting the flash photography;

performing photometry of light of said preliminary flashing coming from an object field and reflected by a light shielding member shielding a film surface;

calculating a quantity of light required for a main flashing based on a result of said photometry;

effecting the main flashing with said flashing device after shifting said light shielding member to a position at which said light shielding member does not shield the film surface;

performing photometry of light of said main flashing coming from the object field and reflected by the film surface;

stopping the main flashing when a photometry result of the light of the object field reflected by the film surface corresponds to said calculated quantity of light; and returning said light shielding member to a position in which said light shielding member shields the film surface.

58. A method according to claim 57, wherein said plural times of preliminary flashing are effected with the quantity of light being varied.

59. A method according to claim 57, wherein said plural times of preliminary flashing are effected at a constant quantity of light.

60. A method according to claim 57, wherein said plural times of preliminary flashing are effected with the quantity of light being decreased.

61. A method according to claim 57, wherein said plural times of preliminary flashing are effected with the quantity of light being increased.

62. A method according to claim 57, wherein said photometry of light of said preliminary flashing and said photometry of light of said main flashing are conducted with the object field being divided into a plurality of areas.

63. A method according to claim 62, including the step determining an area among said plurality of areas which is not used in obtaining said photometry result of the light of the object field reflected by the film surface.

64. A method according to claim 62, including the step of determining a contribution rate of each of said plurality of areas in obtaining said photometry result of the light of the object field reflected by the film surface.

65. A method according to claim 57, wherein number of the times of said preliminary flashing is limited to a predetermined number.

66. A method according to claim 57, wherein said plural times of preliminary flashing are effected with the quantity of light being varied in a fashion of geometrical series.

* * * * *